(12) United States Patent
Broadus et al.

(10) Patent No.: US 10,049,476 B1
(45) Date of Patent: Aug. 14, 2018

(54) SYSTEM AND METHOD OF CREATING AN EDITABLE TEXT AND IMAGES FROM A CAPTURED IMAGE OF A HAND-DRAWN AND/OR STATIC TWO-DIMENSIONAL DIAGRAM

(71) Applicant: SNAPPT, Seattle, WA (US)

(72) Inventors: Charles Broadus, Bothel, WA (US); Ben Demboski, Seattle, WA (US); Paul Watts, Seattle, WA (US); Masanori King Takee, Lynnwood, WA (US); James A Billmaier, Woodinville, WA (US); Kristopher C Billmaier, Kirkland, WA (US); David P Billmaier, Woodinville, WA (US)

(73) Assignee: TURBOPATENT,CORP., Seattle, WA (US)

( * ) Notice: Subject to any disclaimer, the term of this patent is extended or adjusted under 35 U.S.C. 154(b) by 127 days.

(21) Appl. No.: 14/714,228

(22) Filed: May 15, 2015

(51) Int. Cl.
| | |
|---|---|
| *G06T 11/20* | (2006.01) |
| *G06T 11/60* | (2006.01) |
| *G06T 5/00* | (2006.01) |
| *G06T 1/00* | (2006.01) |
| *G06T 7/60* | (2017.01) |
| *G06T 3/40* | (2006.01) |

(52) U.S. Cl.
CPC ............ *G06T 11/60* (2013.01); *G06T 1/0007* (2013.01); *G06T 3/40* (2013.01); *G06T 5/002* (2013.01); *G06T 7/60* (2013.01); *G06T 11/203* (2013.01); *G06T 2207/20024* (2013.01); *G06T 2207/20182* (2013.01); *G06T 2210/12* (2013.01)

(58) Field of Classification Search
CPC ........ G06K 9/6255; G06T 11/206; G06T 5/50
USPC ....................................................... 345/440
See application file for complete search history.

(56) References Cited

U.S. PATENT DOCUMENTS

| | | | | |
|---|---|---|---|---|
| 5,321,770 A | * | 6/1994 | Huttenlocher | G06K 9/00463 382/174 |
| 5,781,655 A | * | 7/1998 | Ens | G01B 11/024 348/135 |
| 2009/0200466 A1 | * | 8/2009 | Mammen | G06T 5/50 250/330 |
| 2010/0172590 A1 | * | 7/2010 | Foehr | H04N 1/00326 382/217 |
| 2011/0035662 A1 | | 2/2011 | King | |
| 2013/0156297 A1 | * | 6/2013 | Shotton | G06K 9/6255 382/159 |
| 2013/0235087 A1 | | 9/2013 | Kashibuchi | |
| 2014/0152665 A1 | * | 6/2014 | Lu | G06T 11/206 345/440 |

* cited by examiner

*Primary Examiner* — Weiming He
(74) *Attorney, Agent, or Firm* — FSP LLC

(57) ABSTRACT

A method of creating an editable image and editable text from a hand-drawn or other static two-dimensional diagram may include receiving a raw image from an image acquisition device; modifying the raw image to a modified image to reduce noise, normalize raw image data, and reduce pixels; recognizing horizontal, vertical, and diagonal lines in the modified image using a line recognizer; connecting the lines in the modified image to form connected lines using a connector that detects and joins proximally positioned terminal ends of the lines in the modified image; recognizing areas bounded by the connected lines as bounded objects using a bounded object recognizer; and/or identifying and classifying the bounded objects using an object identifier.

7 Claims, 35 Drawing Sheets

THE STRING SEPARATOR 1012 RECEIVES AN IMAGE DATA SIGNAL FROM THE STRAIGHT STRING CONVERTER 1010 AND IN RESPONSE IGNORES MODIFIED STRINGS (STRAIGHT LINE, POLYGON, ETC) AND COMPARES STRINGS AGAINST THEMSELVES TO DETERMINE REMOVAL AS CHAFF.

1216

THE SHAPE CONNECTOR 1014 RECEIVES A PROCESSED IMAGE DATA SIGNAL FROM THE STRING SEPARATOR 1012 AND IN RESPONSE USES PROCESSED IMAGE DATA CONTAINING MODIFIED STRINGS WITH PROCESSED POLYGON SET DATA TO GENERATE STRUCTURED DRAWING DATA.

SYSTEM AND METHOD OF CREATING AN EDITABLE TEXT AND IMAGES FROM A CAPTURED IMAGE OF A HAND-DRAWN AND/OR STATIC TWO-DIMENSIONAL DIAGRAM

BACKGROUND

Individuals frequently record their thinking in a visual way, in the form of drawings and sketches on a whiteboard or piece of paper, frequently in a group setting. Such recordings are captured in a static format, and difficult to memorialize in a way that can be easily manipulated to add new formatting, record a new thought, correct misinterpretations, or evolve over time.

Current digital conversion of previously composed, static images including printed, scanned, hand drawn or non-digitally rendered images provides copies of the images in formats such as bitmap, JPEG, TIFF, PNG, GIFF, RAW, WEBP and other formats. These images are resolution dependent, preventing the scaling of the images without loss of quality. Vector formats such as CGM, Gerber, SVG, Adobe Illustrator and the like contain a geometric description which can be rendered smoothly at any desired scale; however, even these images must be rasterized to be displayed on digital monitors. Errors in the digital images cannot be easily corrected, and when scaled, become more apparent.

Along with scaling issues, the content of the reproduced image cannot be easily changed or manipulated. Layers may be applied over the digitized image, but there are limits as to how much can be accomplished. For example, if a page is scanned in at a slight angle, it is difficult, if not impossible, to right the image until it is square on the screen. If material is added to the image, or parts of the image are rearranged, it is difficult to have clean breaks, smooth edges, or match font sizes and colors. There is limited compatability between drawing programs so that frequently the only way to correct or alter an image such as a diagram is to rewrite it completely. There is therefore a need for a means to read static image formats and convert them into editable images.

Along with scaling issues, the content of the reproduced image cannot be easily changed or manipulated. Layers may be applied over the digitized image, but there are limits as to how much can be accomplished. For example, if a page is scanned in at a slight angle, it is difficult, if not impossible, to right the image until it is square on the screen. If material is added to the image, or parts of the image are rearranged, it is difficult to have clean breaks, smooth edges, or match font sizes and colors. There is limited compatability between drawing programs so that frequently the only way to correct or alter an image such as a diagram is to rewrite it completely. There is therefore a need for a means to read static image formats and convert them into editable images.

Along with scaling issues, the content of the reproduced raw image cannot be easily changed or manipulated. Layers may be applied over the digitized raw image, but there are limits as to how much can be accomplished. For example, if a page is scanned in at a slight angle, it is difficult, if not impossible, to right the raw image until it is square on the screen. If material is added to the raw image, or parts of the raw image are rearranged, it is difficult to have clean breaks, smooth edges, or match font sizes and colors. There is limited compatability between drawing programs so that frequently the only way to correct or alter a raw image such as a diagram is to rewrite it completely. There is therefore a need for a means to read static raw image formats and convert them into editable images.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 13 is a flow chart of an embodiment of an image refinement process.

DETAILED DESCRIPTION

Glossary

Figure 1:
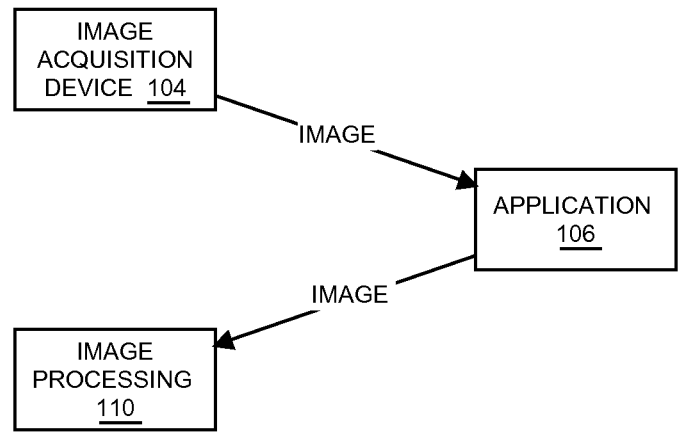
FIG. 1 is a system diagram of an embodiment of an image capturing and re-creation system.

"Accelerometer" in this context refers to logic, typically a circuit, that senses tilt and motion. A device with an accelerometer senses what angle relative to a reference plane that it is oriented at. Accelerometers are also used to detect changes in velocity. An accelerometer measures linear acceleration of movement. It can also measure movements such as rotation, and motion gestures such as swinging, shaking, and flicking. One common use is to detect whether an object is upright or sideways. Another common use is controlling devices by movement, shaking, or tilt. Formally, an accelerometer is a logic component that produces a signal indicating and typically in proportion to a change in velocity and/or orientation relative to a reference plane, commonly a gravitational reference plane.

"Audio" in this context refers to a representation of sound within a device or a physical storage or communication media, typically as either analog or digital signals "Camera" in this context refers to a device that includes a light collecting chamber with an aperture fitted with a lens and typically a shutter through which the image of an object is projected onto a surface for recording (as in machine memory) or for translation into electrical impulses (as for television broadcast)

"filter" in this context refers to in optics and photography, a device to remove, or to enhance, certain ranges of wavelengths of light; in computer science/signal processing, logic for removing part(s) of a signal or data; in mathematics, a special subset of a partially ordered set "Gyroscope" in this context refers to a sensor, or gyro for short, that measures or detects rotation or twist in the orientation of a device. A gyro measures the angular rotational velocity.

"Image" in this context refers to information captured and stored by a device representing a visual perception, usually a two-dimensional picture. Images may be captured, stored, and communicated by devices in either analog or digital formats.

"panorama" in this context refers to multiple images stitched together to form a continuous representation of markings on physical surface.

"persistent storage" in this context refers to a machine memory configuration that exceeds the scope of the logic which creates it, i.e. the memory configuration will survive a loss of power that destroys the logic that created it, or will survive the session or context under which it was created.

"Pixel" in this context refers to The smallest visual unit in an electronic display or visual data file; a single "dot". Most modern electronic displays are composed of a grid of pixels. Each pixel can be turned on or off, or—in the case of full-color displays—dimmed or made a specific color. In this way, pixels are individually controlled to cause the whole display to show information and graphics. An important measure of an electronic display the number of pixels. More pixels allow the display to show more detail and more information. This is called "resolution", and is typically stated in terms of vertical and horizontal pixels (such as 240×320). Pixels can also be used to describe the smallest visual unit in a visual data file, such as a captured photograph or video clip. Pixel comes from "pix" (for "picture") and el (for "element"). A pixel is the smallest piece of information on an image. This is a unit for measuring image resolution, and the more pixels a picture consists of, the more detailed it is.

"Scanner" in this context refers to a device that reflects signals (e.g., electromagnetic) off of a physical object, and converts the reflections into digital data representing the physical object. An optical scanner uses reflected light to scan images, printed text, handwriting, or an object, and converts the reflections to digital data.

DESCRIPTION

A method of creating an editable image and editable text from a hand-drawn or other static two-dimensional diagram may include receiving a raw image from an image acquisition device; modifying the raw image to a modified image to reduce noise, normalize raw image data, and reduce pixels; recognizing horizontal, vertical, and diagonal lines in the modified image using a line recognizer; connecting the lines in the modified image to form connected lines using a connector that detects and joins proximally positioned terminal ends of the lines in the modified image; recognizing areas bounded by the connected lines as bounded objects using a bounded object recognizer; and/or identifying and classifying the bounded objects using an object identifier.

Modifying the raw image may include reducing the pixels by reducing pixel information to a single channel to form a reduced raw image, generating a copy of the raw image and applying a smoothing filter to the copy of the raw image to produce a filtered copy of the raw image, and/or subtracting the filtered copy of the raw image from the reduced raw image to remove a raw image background resulting in pixel sets identifiable as linear segments.

Modifying the raw image may include determining a starting threshold based on an intensity gradient of the raw image, adjusting the starting threshold to minimize a number of isolated pixels in the raw image, performing a threshold operation to further reduce the pixels, and/or performing dilation/erosion operations to adjust a thickness of identifiable linear segments.

Recognizing the lines in the modified image using the line recognizer may include scanning the modified image signal and identifying a starting pixel based on a particular pixel value; locating an ending pixel connected to the starting pixel by a linear path of pixels equal to a value of the starting pixel; recognizing the linear path of pixels as a line segment; and/or identifying, locating, and recognizing additional starting pixels. Recognizing the lines in the modified image using the line recognizer may include identifying the ending pixel as a new starting pixel.

Recognizing areas bounded by the connected lines as the bounded objects through the bounded object recognizer may include identifying a first intersection of two lines within a bounding object as a first vertex, identifying a second intersection of two lines within the bounding object as a second vertex, calculating an average line length for the lines in the modified image based on a distance between the first vertex and the second vertex, and/or identifying lines that do not form the bounding object as strings.

Described herein is a method and system for creating an editable image and editable text from a hand-drawn or other static two-dimensional diagram. A hand-drawn or other static raw image is captured using a device for recording visual images such as a camera, phone, video recorder, scanner, audio recording device, other such device, or a combination thereof. In some embodiments, the images may be recordings with the help of an accelerometer, gyroscope, or other means for combining motion data with an alignment algorithm. Images may be inputted from panoramic or standard frame images. In some embodiments, devices may capture multiple frames of the same object, information from which can be aggregated to produce the best manipulable digital raw image. In further embodiments, images may be resident on a computer or have been rendered by a computer or computer program.

As individuals frequently doodle or create multiple images on a single piece of paper or white board, users can select whether all or part of the captured raw image should be converted. In some embodiments, the application may zoom in on a particular aspect of a drawing or other raw image for clarification. In other embodiments, the raw image capturing device may show a preview of a raw image to a user so that the user can adjust the input to capture the most accurate raw image for processing. In further embodiments, the raw image may be captured by uploading a previously created raw image from persistent storage and processed as described below.

The captured raw image is then processed to identify each object in the raw image and determine what each object represents. The objects are then recreated in digital format and superimposed in a layer over the captured raw image so that the user can correct or edit the objects to represent the desired information or achieve the desired effect. The opacity of the recreated raw image may be increased or decreased to make the original raw image more or less visible under the recreated raw image. This allows a user to easily compare the original static raw image to the re-created raw image.

Object identification and recreation may be accomplished by processing the captured raw image to reduce noise, normalize the raw image data, and reduce pixel information using edge detection algorithms. Noise reduction may occur by any means generally used. In some embodiments, noise reduction occurs by the application of one or more filters such as a Gaussian filter, bilateral filter and/or guided filter. Such filters may be applied alone, or in combination in any order.

Once the noise in the raw image is reduced as much as possible, the intensity gradient of the raw image is located using one or more operators including the Sobel operator, Prewitt operator, and Robert Cross Operator. Such operators may be applied alone, or in combination in any order. The application of these operators allows for the isolation of horizontal, vertical and diagonal lines in the captured raw image.

Once the raw image gradients are determined, a search is carried out to determine if the gradient magnitude assumes a local maximum in the gradient direction. Non-Maximum suppression is then applied to remove unwanted pixels and help thin edges. Pixels that belong to an edge are then identified using thresholding hysteresis. Using thresholding hystereisis, two thresholds are determined, high and low. A high threshold is initially applied marking the edges that are more likely to be certain. The Object recognizer (904) assumes that important edges are along continuous curves, allowing the capturing of faint sections of lines while discarding background pixels that do not constitute a line. Starting from these and using directional information, edges are traced through the raw image and a lower threshold is then applied, allowing faint sections of edges to be added to the re-created raw image.

In some embodiments, once edge detection is completed, the raw image may be further refined using a Hough transform to identify shapes and lines. The Hough transform may be further refined using gradient direction to reduce the number of votes in a parameter space using kernel-based Hough transform and Hough transform of curves.

Once the captured raw image is processed and the objects in the raw image are defined, shape recognition is applied. Shape recognition may be applied by any means generally used. In some embodiments, the number of continuous lines in a shape may be identified with sharp angle changes signifying a different line allowing shapes to be identified based on the number of lines in each object. For example, three or more lines is identified as a polygon, 1 line is identified as a circle. In other embodiments, shape identity can be further refined based on the angles and lengths of the lines to determine more specific shapes such as squares, triangles, rectangles, rhombuses, or various triangle types. In additional embodiments, shapes may be identified based on pattern recognition. In some embodiments, the user may be presented with options for each object according to degrees of certainty of recognition. The user can then select the correct identification to be applied to the object, may enter the name of a different object, or may edit the shape of the object to appear as desired. In additional embodiments, the user may choose to output the diagram in such a hybrid format with part of the diagram remaining in the hand drawn or static raw image format.

Any text within the raw image may be processed using optical character recognition (OCR). In some embodiments, the processing may include a learning mode to improve its recognition of an individual's handwriting and the shapes they generally draw in a diagram.

Once processed, the digitally generated reproduction of the static raw image may then be manually edited. Portions of the raw image that could not be identified will be correctable by the end user. In some embodiments, the manipulable raw image may be superimposed on the captured raw image, allowing the individual manipulating the raw image to compare the original and the reproduced raw image line by line. In additional embodiments, more complex elements may be brought into the raw image in other formats such as a JPEG, bitmap, TIFF, PNG, or GIFF. The digitally generated reproduction may then be saved in persistent storage. In some embodiments, the finished reproduced raw image may be converted to other useful file formats generally used for displaying information.

The overall processing may include the following relevant actions:
Prepare the raw image
Find strings and Polygons
Adjust Line Lengths Based on Polygon Sizes
Clean Up strings
Convert String Segments to Lines
Find Arrowheads on the Ends of Lines
Sort Out Chaff from strings
Detect Probable Text Squares Clean up Polygons into Basic Shapes as Appropriate
Classify Refine Standard Shapes among the Polygons
Find Connected Shapes Prepare the Raw Image This is a preliminary step to remove the background (shading, reflections, etc.) from the drawing. The first step is to remove the background. This is done by 'Prepare the raw image' by the following steps:

1. Converting an RGB raw image to greyscale and resizing it to a standard size [previously this was done by the application]
2. Creating a copy (background) of the original raw image and perform a wide-window, median-smoothing of the entire copy.
3. Subtracting the background raw image from the original raw image. This removes the background from the raw image leaving the greyscale lines.
4. Calculating a starting threshold based on the rate of change of the number of pixels beneath the threshold.
5. Adjusting the threshold value to minimize the number of isolated pixels (noise). If the threshold is too low, the number of isolated pixels is high. If the threshold is too high, the number of isolated pixels is increases due to eroded lines.
6. Performing the threshold operation on the enhanced raw image to produce a monochrome raw image of lines and background.
7. Performing dilation or erosion operations on the raw image to adjust the line thickness to an optimized value.

Find Strings and Polygons

This step is performed to identify polygon shapes from lines in a raw image signal. The raw image is scanned and connected sets of pixels are converted to connected lines. Connected line sets that form closed shapes are identified as polygons and are removed and added to a polygon set, while connected line sets that do not form closed shapes are understood as strings. This is done by 'Find strings and Polygons' by the following steps:

1. Search for white pixels by scanning the raw image from left to right and bottom to top.
2. When a white pixel is found,
  a. Search the surrounding pixels to create the longest straight line passing through only white pixels. Mark the pixels close to the line as found.
  b. From the start of the line,
    i. Search the surrounding pixels to create the longest connected straight line passing through only white pixels. Mark the pixels close to the line as found.
    ii. Continue with step (i) until a dead end is reached such as when no more white or found pixels.
    iii. If an intersection is found (two connected lines can be formed) remember the intersection and continue with step (i) in each available direction.
  c. From the end of the line, perform steps b. (i), b. (ii), and b. (iii).
3. Scan through the strings looking for lines end close to another line. If found, connect them.
4. Find connected lines that form closed shapes (polygons). Extract the polygons in order of shortest to largest path.
5. Classify the remaining (not closed) connected lines as strings.

Adjust the Line Length

A parameter is used to determine whether a string is a line or not. This parameter is adjusted using the average polygon size. The assumption is that if the average polygon size is large, lines are large and vice versa. This is done by 'Adjust the Line Length' by the following steps:

1. Scanning through each poly and calculate the distance between the two farthest vertexes.
2. Calculating the average of these distances.
3. Adjust the minimum line length parameter based on the average.

Clean Up Strings

Look for strings that are too short or somewhat short and overlay other strings and move them to the chaff category. This is done by 'Clean up strings' by the following steps:

1. Scan through the strings.
2. Calculate the length of each string.
3. If the string is shorter than a parameter, move it to chaff.
4. If the string is shorter than another parameter and overlays another string, move it to chaff. This catches strings that are created from residue of the original string and polygon search.

Convert Straight Strings to Lines

Looks at each string and see if it qualifies as a line. This is done by 'Convert Straight strings to Lines' by the following steps:

1. Scan through the strings
2. Find the two vertexes of each string that are farthest apart.
3. Calculate the shortest route between the vertexes.
4. Create a set of points representing the lines along the shortest route.
5. Fit a line to the set of points.
6. If the line is greater than the minimum line length parameter,
  a. Calculate the average error of the points to the line.
  b. If the error is less than the minimum line length parameter,
    i. Remove the line segments making up the line from the original string.
    ii. Move all remaining disconnected segments to new strings (for example, this might be arrowheads).
    iii. Define a line from the best-fit parameters.
    iv. Calculate the confidence that this is a line based on the error of the vertexes.
    v. Add the new line to the lines.

Find Arrowheads

For all lines, look for other lines, strings and chaff to see if they form an arrowhead. This is done by 'Find Arrowheads' by the following steps:

1. Scan through the lines.
2. For each end of the line,
  a. Search other lines that might form part of the left or right side of an arrowhead for the line.
  b. Search strings that might form part of the left or right side of an arrowhead for the line.
  c. Search chaff that might form part of the left or right side of an arrowhead for the line.
3. Validate the arrowheads,
  a. Ensure there are two sides to an arrowhead.
  b. Make sure the arrowhead lengths are similar.
  c. Make sure the angles of the arrow sides are similar relative to the line.
4. If the arrowhead is valid, mark the line as having an arrowhead.

5. Remove the lines, strings and chaff that make up the arrowhead.

Find Strings that Qualify as Chaff

For all strings, look for strings that should be chaff. The original strings have been modified by removing polygons, lines. This is done by 'Find strings that Qualify as Chaff' by the following steps:

1. Scan through the strings.
2. Check each string against other strings to see if it is chaff.
   a. Is it isolated from other strings?
   b. Is it short?
3. If it is chaff, remove it from the strings and add it to the chaff.

Find Probably Text

Look for strings, lines and chaff that may be text. This is done by 'Find Probably Text' by the following steps:

1. Assume any strings, lines or chaff that are fully enclosed in a polygon are assumed to be text.
   a. Check each line to see if it is fully-enclosed within a polygon. If so, add it to the text.
   b. Check each chaff to see if it is fully-enclosed within a polygon. If so, add it to the text.
   c. Check each string to see if it is fully-enclosed within a polygon. If so, add it to the text.
2. For each string, examine the bounding rectangle and see if it meets the width and height and width-to-height ratios to be text. If so, add it to text.
3. Look for text rectangles that are in close proximity to each other and combine them as one text object.
4. Scan through the chaff and add any chaff enclosed within a text box to the text for that text box.
5. Add the text and text boxes to the text collection.

Clean Up Polygons into Basic Shapes as Appropriate

Look at each polygon and see if it is close to a basic shape from a triangle to a pentagon. This is done by 'Clean Up Polygons into Basic Shapes as Appropriate' by the following steps:

1. Scan through the polygons
2. Calculate the best fit error of 3-sided (triangle) through 5-sided (pentagon) polygons.
3. Select the shape that has the lowest error.
4. If the error is low enough, replace the polygon vertexes with the best-fit vertexes.

Classify Refine Standard Shapes Among the Polygons

Examine each polygon found and see if it is a rectangle, a circle, a triangle, a cloud, or just an n-sided polygon. For each polygon:

1. Check for a 4-sided polygon and classify it,
   a. If it does not have 4 line segments, go to step 2.
   b. Based on which sides are close to parallel, or close to equal length, classify the shape as a:
      i. Rectangle
      ii. Parallelogram
      iii. Trapezoid
      iv. Rhombus
      v. Square
      vi. 4-sided polygon
   c. If any of (i) through (v), adjust the sides of the shape to ideal shapes.
   d. Calculate the confidence level based on the fit error between the original polygon points and the ideal
   e. Save the shape details.
2. Check for a 3-sided polygon and classify it,
   a. If it does not have 3 line segments, go to step 3.
   b. If the distance of a vertex to the opposite side is too short relative to the others, set this to a 3-sided polygon
   c. Based on the lengths of the sides adjust the sides and true up the shape to be either a
      i. Equilateral Triangle
      ii. Isosceles Triangle
      iii. General Triangle
   d. Calculate the confidence level based on the fit error between the original polygon points and the ideal.
   e. Save the shape details.
3. Check if the polygon is a Cloud.
   a. If the polygon has less than a parameter number of vertexes, go to step 4.
   b. Calculate the centroid of the vertexes.
   c. Calculate the distances from each vertex to the centroid.
   d. Start at the closest vertex and find the alternate closest and farthest vertexes.
   e. For each closest-farthest-closest vertexes, calculate how well the vertexes between the two close vertexes fit an ellipse. This fits the "petals" of the cloud.
   f. If the error of the fits is greater than a parameter or the number of petals is less than a parameter, go to step 4.
   g. Calculate the confidence level based on the petal fit error.
   h. Save the shape details.
4. Check for an ellipse or circle.
   a. Fit the points to an ellipse using the Simplex method fitting algorithm.
   b. Determine the average and maximum error of the fit to the fit points. If the average error is less than a tolerance and the maximum error is less than a given tolerance, mark it as an ellipse.
      i. Compare the major and minor axes of the ellipse. If the difference is less than a tolerance,
         1. Fit a circle to the fit points.
         2. Mark the shape as a circle.
      ii. Calculate the confidence based on the fit error.
      iii. If the shape is not a circle, check the angle of the ellipse and if it is close to horizontal/vertical, make it horizontal/vertical.
      iv. If the shape is not a circle or ellipse, mark it as an a polygon
   c. Save the shape details Find Connected Shapes Find lines that appear to connect shapes and mark them with the shape numbers. This is done by 'Find Connected Shapes' by the following steps:

1. For each line, check the end points to see if they are close to the identified shapes.
2. If the shape is close mark the line with that shape number.

Other Refinements to be Pursued

1. Parallax and Tilt—correcting for pictures taken when the camera charge-coupled device (CCD) is not parallel to the whiteboard.
2. Detection and exclusion of areas that are not part of the whiteboard.
3. Use of color to segment shapes—currently everything is being done in greyscale. Using colors would help identify connected line segments.

DRAWINGS

Figure 2:
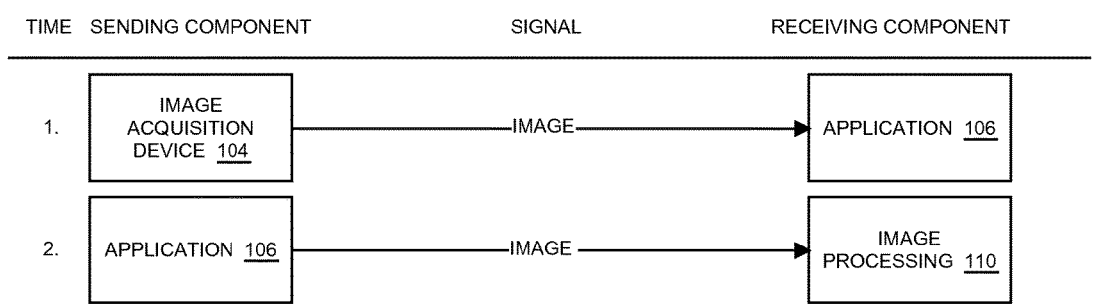
FIG. 2 is an action flow diagram of an embodiment of an image capturing and re-creation system process.
Figure 3:
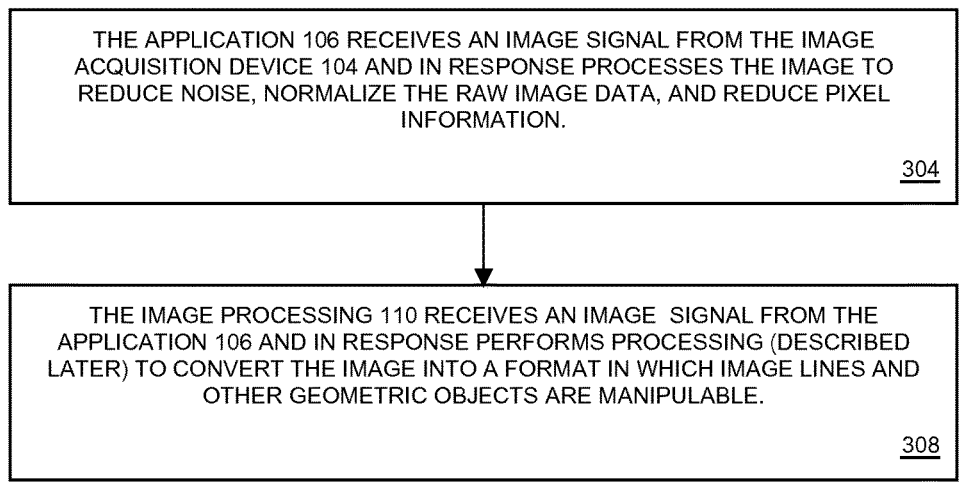
FIG. 3 is a flow chart of an embodiment of an image capturing and re-creation system process.

FIG. 1 is a system diagram of an embodiment of a raw image capturing and re-creation system. FIG. 2 is an action flow diagram of an embodiment of a raw image capturing and re-creation system process. FIG. 3 is a flow chart of an embodiment of a raw image capturing and re-creation system process. Collectively, these drawings illustrate a high level system for raw image acquisition and processing. The system comprises Image acquisition device 104, Application 106, and Image Processing 110. Application 106 receives a raw image signal from Image acquisition device 104 and in response processes the raw image to reduce noise, normalize the raw image data and reduce pixel information (304). Image Processing 110 receives a raw image signal from Application 106 and in response performs processing (described later) to convert the raw image into a format in which raw image lines and other geometric objects are manipulable (308).

Figure 4:
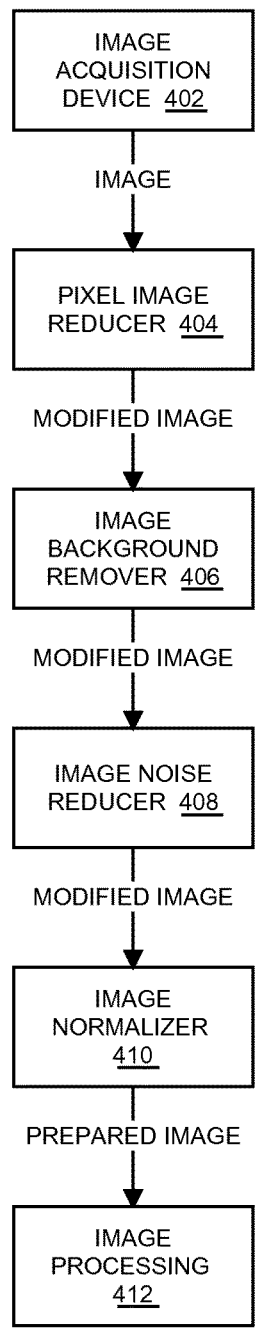
FIG. 4 is a system diagram of an embodiment of a preliminary image preparation process.
Figure 5:
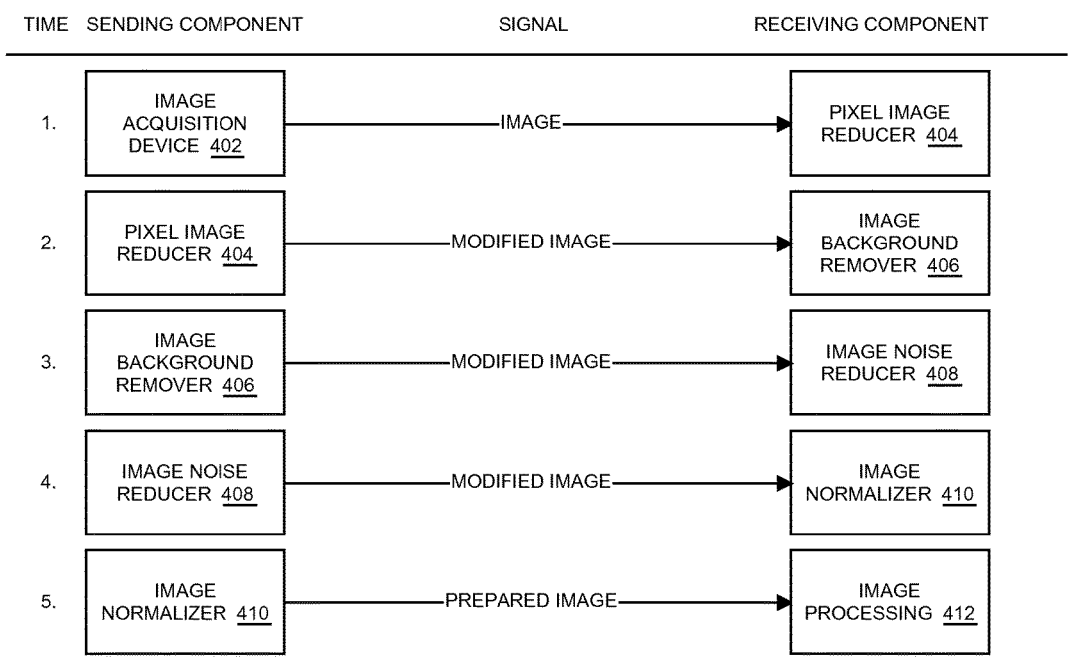
FIG. 5 is an action flow diagram of an embodiment of a preliminary image preparation process.
Figure 6:
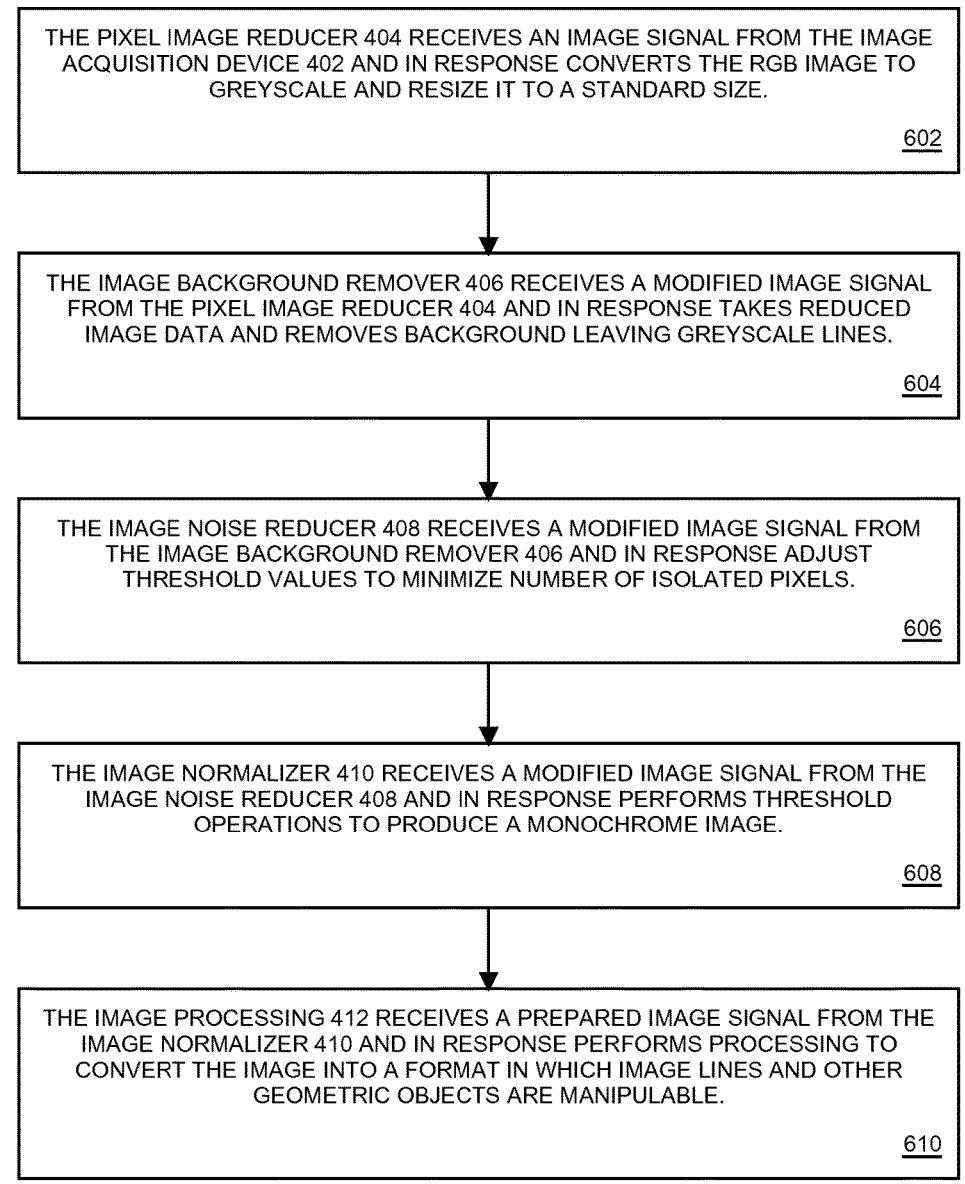
FIG. 6 is a flow chart of an embodiment of a preliminary image preparation process.

FIG. 4 is a system diagram of an embodiment of a preliminary image preparation process. FIG. 5 is an action flow diagram of an embodiment of a preliminary image preparation process. FIG. 6 is a flow chart of an embodiment of a preliminary image preparation process. The system comprises Image Acquisition Device 402, Pixel Image reducer 404, Image Background Remover 406, Image noise reducer 408, Image normalizer 410, and Image Processing 412. The Pixel Image reducer 404 receives an Image signal from the Image Acquisition Device 402 and in response Converts the RGB image to greyscale and resize it to a standard size (602). The Image Background Remover 406 receives a Modified Image signal from the Pixel Image reducer 404 and in response takes reduced image data and removes background leaving greyscale lines (604). The Image noise reducer 408 receives a Modified Image signal from the Image Background Remover 406 and in response adjust threshold values to minimize number of isolated pixels (606). The Image normalizer 410 receives a Modified Image signal from the Image noise reducer 408 and in response performs threshold operations to produce a monochrome image (608). The Image Processing 412 receives a Prepared Image signal from the Image normalizer 410 and in response performs processing to convert the image into a format in which image lines and other geometric objects are manipulable (610).

Figure 7:
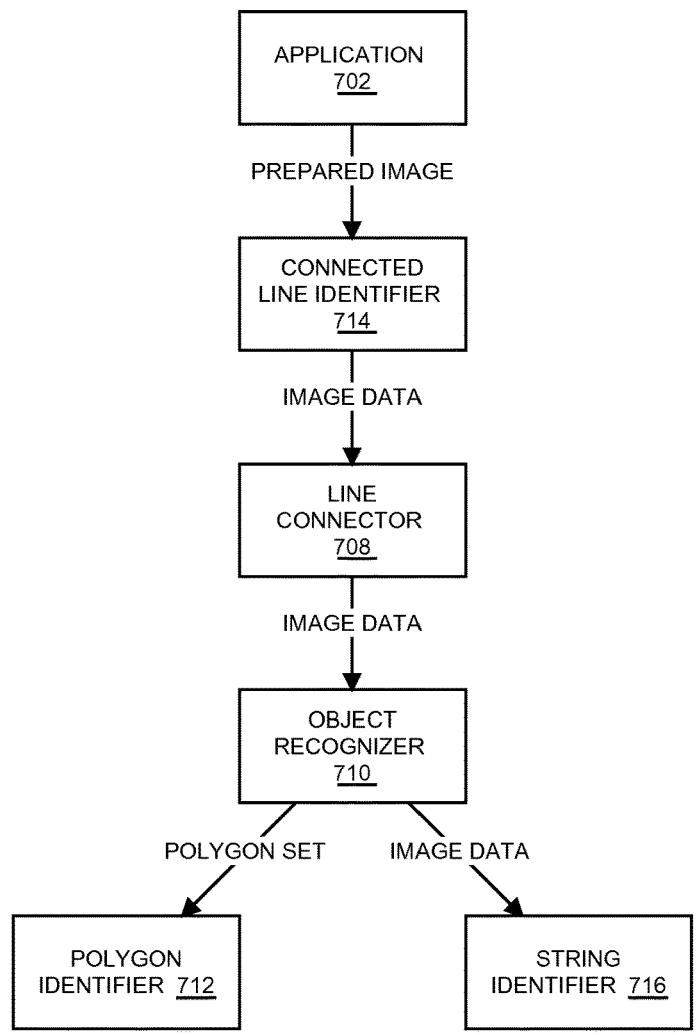
FIG. 7 is a system diagram of an embodiment of a string and polygon identification process.
Figure 8:
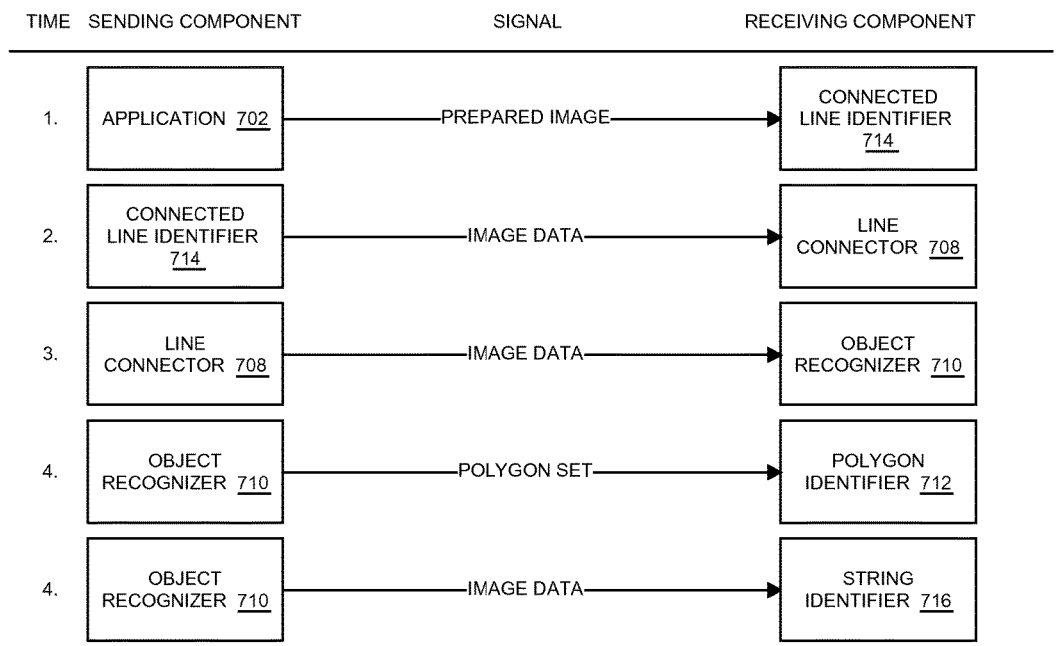
FIG. 8 is an action flow diagram of an embodiment of a string and polygon identification process.
Figure 9:
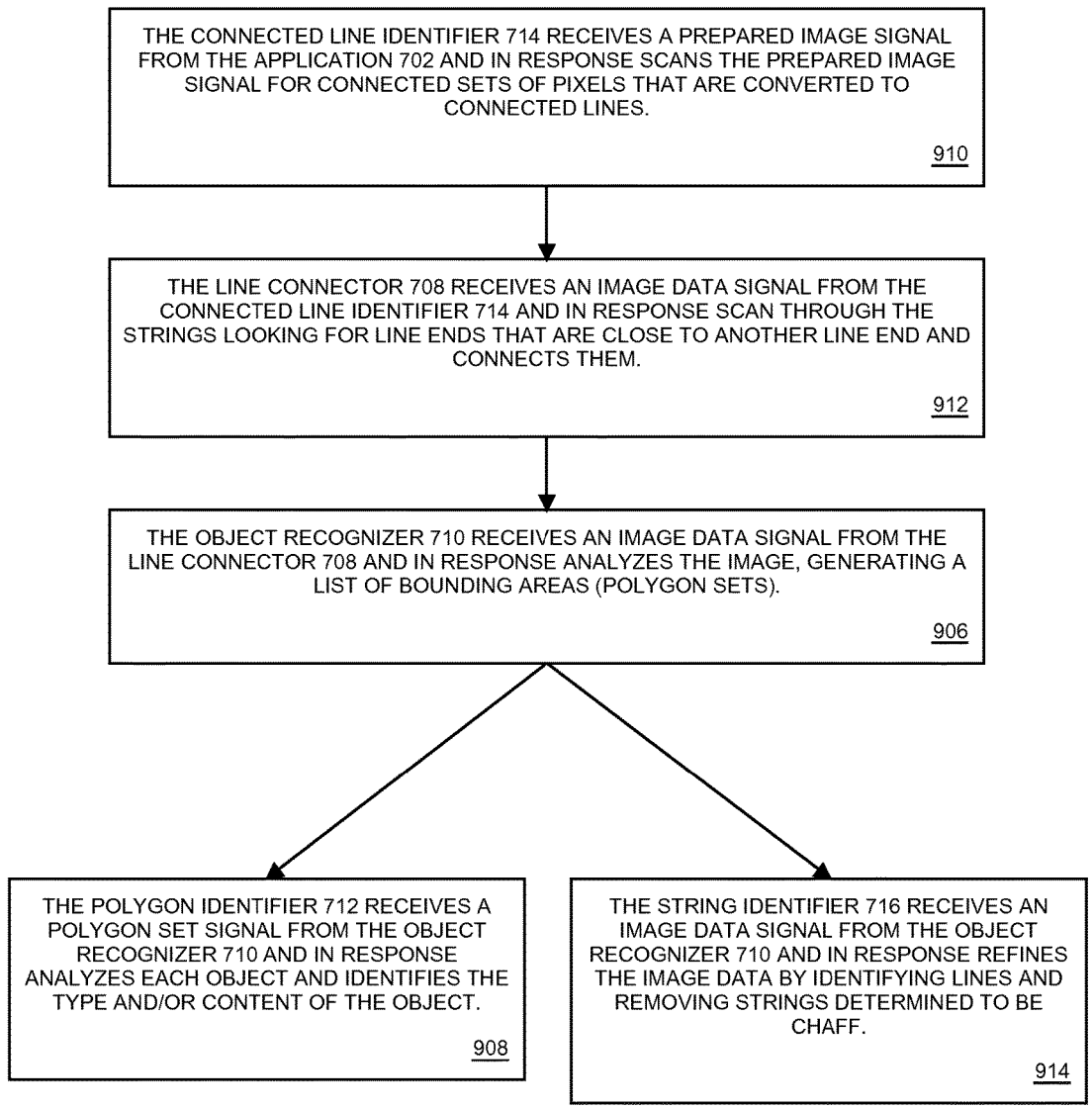
FIG. 9 is a flow chart of an embodiment of a string and polygon identification process.

FIG. 7 is a system diagram of an embodiment of a string and polygon identification process. FIG. 8 is an action flow diagram of an embodiment of a string and polygon identification process. FIG. 9 is a flow chart of an embodiment of a string and polygon identification process. The system comprises Application 702, Line connector 708, Object Recognizer 710, Polygon Identifier 712, Connected line Identifier 714, and String Identifier 716. The Connected line Identifier 714 receives a prepared image signal from the Application 702 and in response scans the prepared image signal for connected sets of pixels that are converted to connected lines (910). The Line connector 708 receives an Image data signal from the Connected line Identifier 714 and in response Scan through the strings looking for line ends that are close to another line end and connects them (912). The Object Recognizer 710 receives an Image Data signal from the Line connector 708 and in response analyzes the image, generating a list of bounding areas (polygon sets) (906). The Polygon Identifier 712 receives a Polygon Set signal from the Object Recognizer 710 and in response analyzes each object and identifies the type and/or content of the object (908). The String Identifier 716 receives an Image data signal from the Object Recognizer 710 and in response refines the image data by identifying lines and removing strings determined to be chaff (914).

Figure 10:
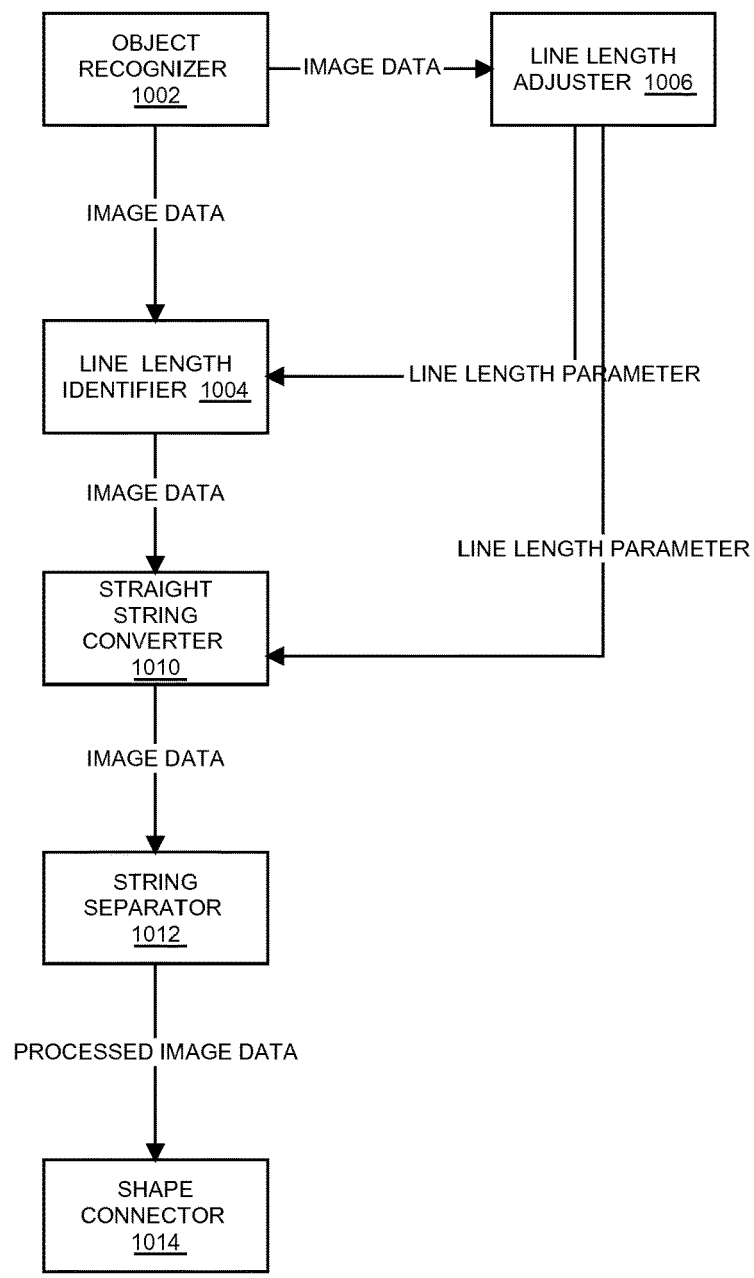
FIG. 10 is a system diagram of an embodiment of an image refinement process.
Figure 11:
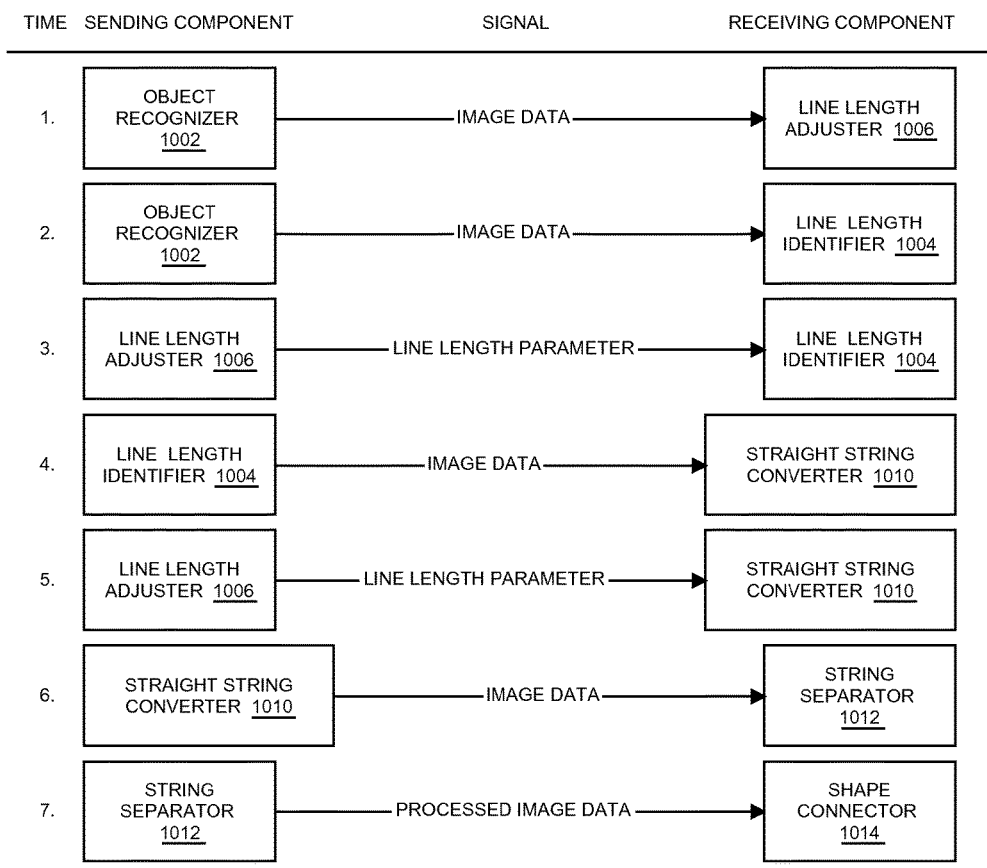
FIG. 11 is an action flow diagram of an embodiment of an image refinement process.
Figure 12:
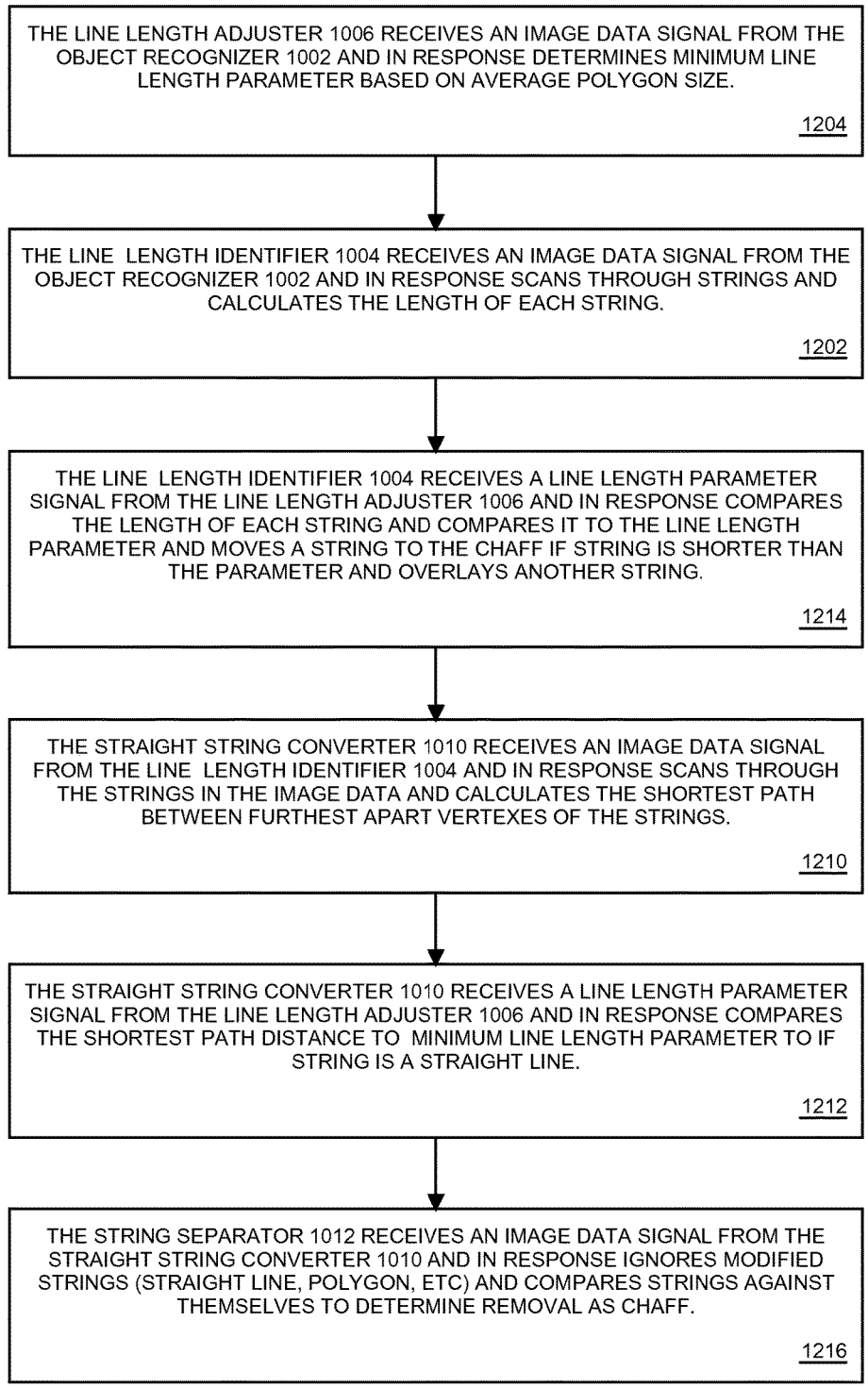
FIG. 12 is a flow chart of an embodiment of an image refinement process.

FIG. 10 is a system diagram of an embodiment of an image refinement process. FIG. 11 is an action flow diagram of an embodiment of an image refinement process. FIG. 12 is a flow chart of an embodiment of an image refinement process. FIG. 13 is a flow chart of an embodiment of an image refinement process. The system comprises Object Recognizer 1002, Line Length Identifier 1004, Line Length Adjuster 1006, Straight String Converter 1010, String Separator 1012, and Shape Connector 1014. The Line Length Adjuster 1006 receives an Image data signal from the Object Recognizer 1002 and in response determines minimum line length parameter based on average polygon size. (1204). The Line Length Identifier 1004 receives an Image data signal from the Object Recognizer 1002 and in response scans through strings and calculates the length of each string (1202). The Line Length Identifier 1004 receives a Line Length Parameter signal from the Line Length Adjuster 1006 and in response compares the length of each string and compares it to the line length parameter and moves a string to the chaff if string is shorter than the parameter and overlays another string (1214). The Straight String Converter 1010 receives an Image data signal from the Line Length Identifier 1004 and in response scans through the strings in the image data and calculates the shortest path between furthest apart vertexes of the strings (1210). The Straight String Converter 1010 receives a Line Length Parameter signal from the Line Length Adjuster 1006 and in response compares the shortest path distance to minimum line length parameter to if string is a straight line (1212). The String Separator 1012 receives an Image data signal from the Straight String Converter 1010 and in response ignores modified strings (straight line, polygon, etc) and compares strings against themselves to determine removal as chaff. (1216). The Shape Connector 1014 receives a Processed Image Data signal from the String Separator 1012 and in response uses processed image data containing modified strings with processed polygon set data to generate structured drawing data (1220).

Figure 14:
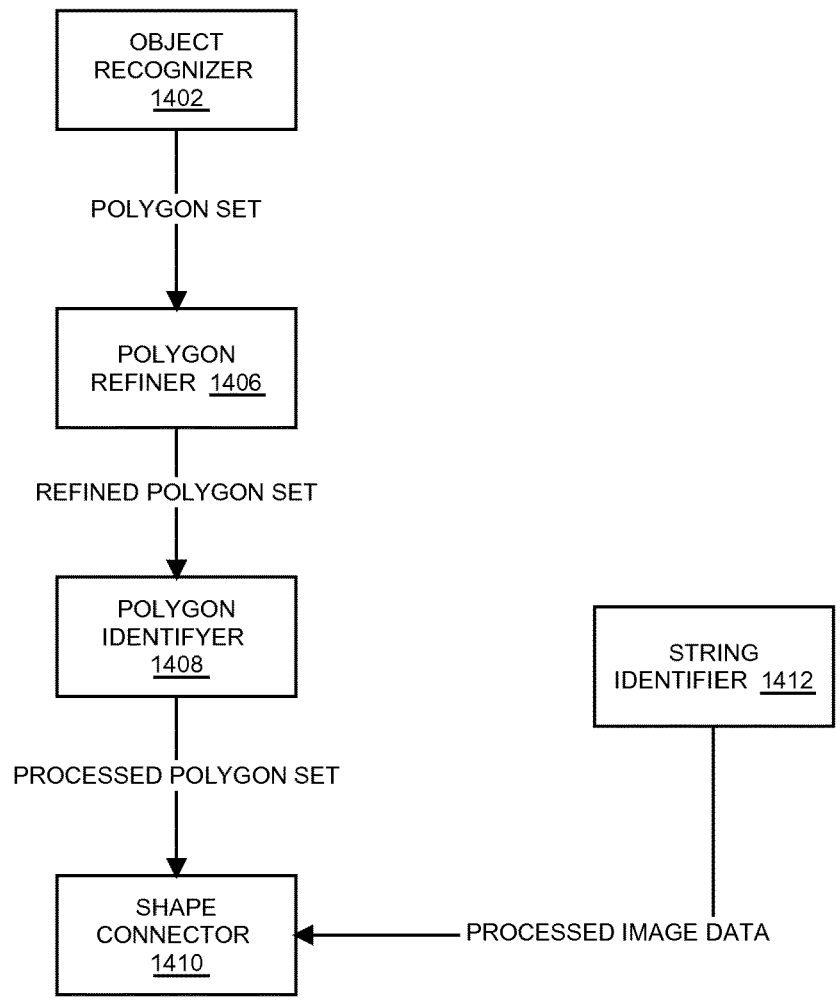
FIG. 14 is a system diagram of an embodiment of an object identification and refinement process.
Figure 15:
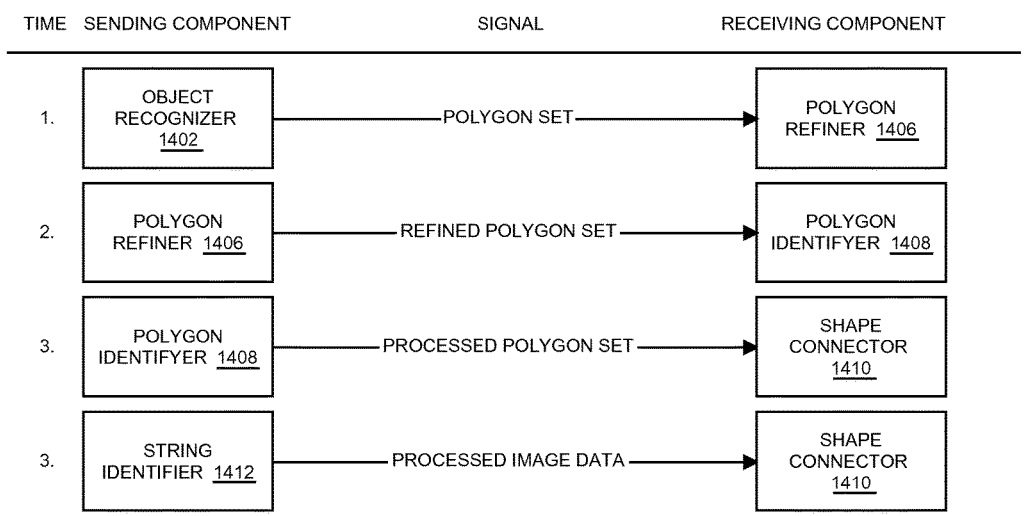
FIG. 15 is an action flow diagram of an embodiment of an object identification and refinement process.
Figure 16:
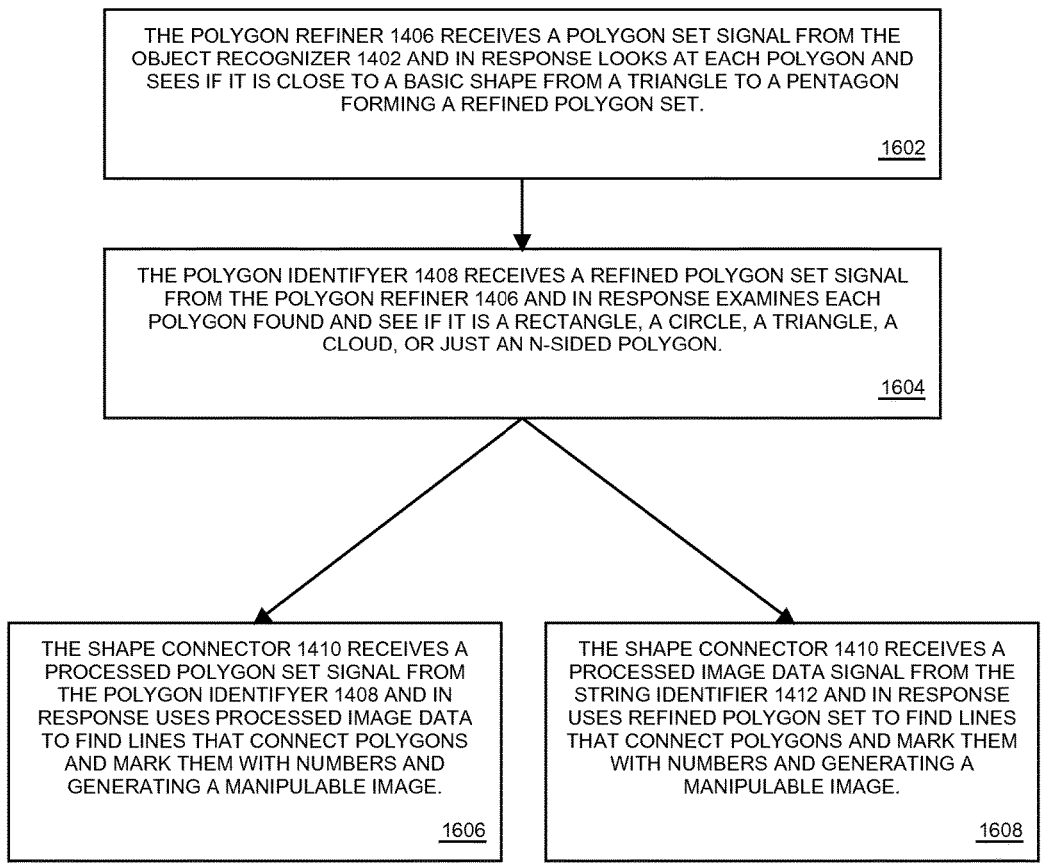
FIG. 16 is a flow chart of an embodiment of an object identification and refinement process.

FIG. 14 is a system diagram of an embodiment of an object identification and refinement process. FIG. 15 is an action flow diagram of an embodiment of an object identification and refinement process. FIG. 16 is a flow chart of an embodiment of an object identification and refinement process. The system comprises Object Recognizer 1402, Polygon Refiner 1406, Polygon Identifyer 1408, Shape Connector 1410, and String Identifier 1412. The Polygon Refiner 1406 receives a Polygon set signal from the Object Recognizer 1402 and in response Looks at each polygon and sees if it is close to a basic shape from a triangle to a pentagon forming a refined polygon set. (1602). The Polygon Identifyer 1408 receives a Refined Polygon set signal from the Polygon Refiner 1406 and in response Examines each polygon found and see if it is a rectangle, a circle, a triangle, a cloud, or just an n-sided polygon (1604). The Shape Connector 1410 receives a Processed Polygon Set signal from the Polygon Identifyer 1408 and in response uses processed image data to find lines that connect polygons and mark them with numbers and generating a manipulable image (1606). The Shape Connector 1410 receives a Processed Image data signal from the String Identifier 1412 and in response uses refined polygon set to find lines that connect polygons and mark them with numbers and generating a manipulable image (1608).

Figure 17:
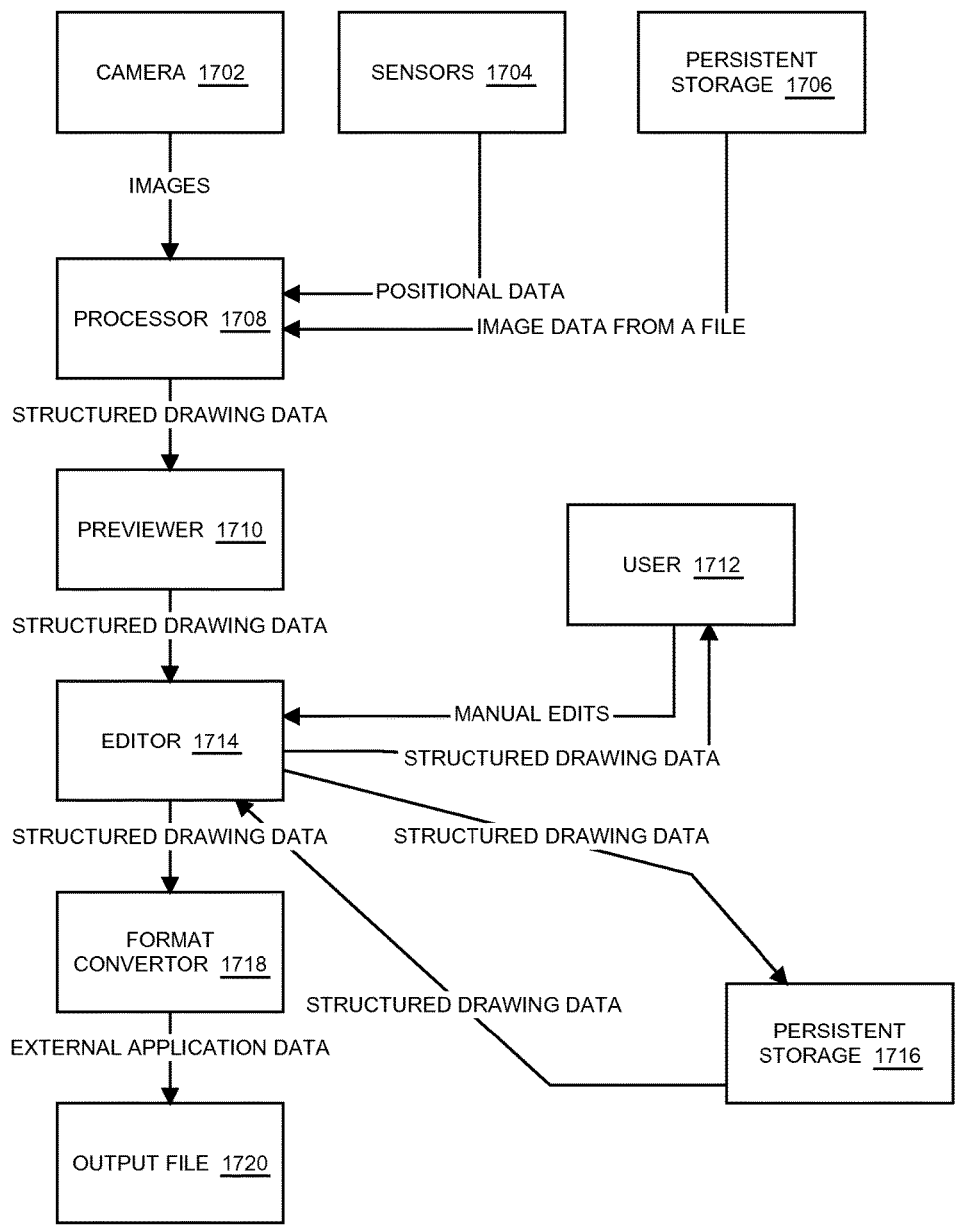
FIG. 17 is a system diagram of an embodiment of an image processing system.
Figure 18:
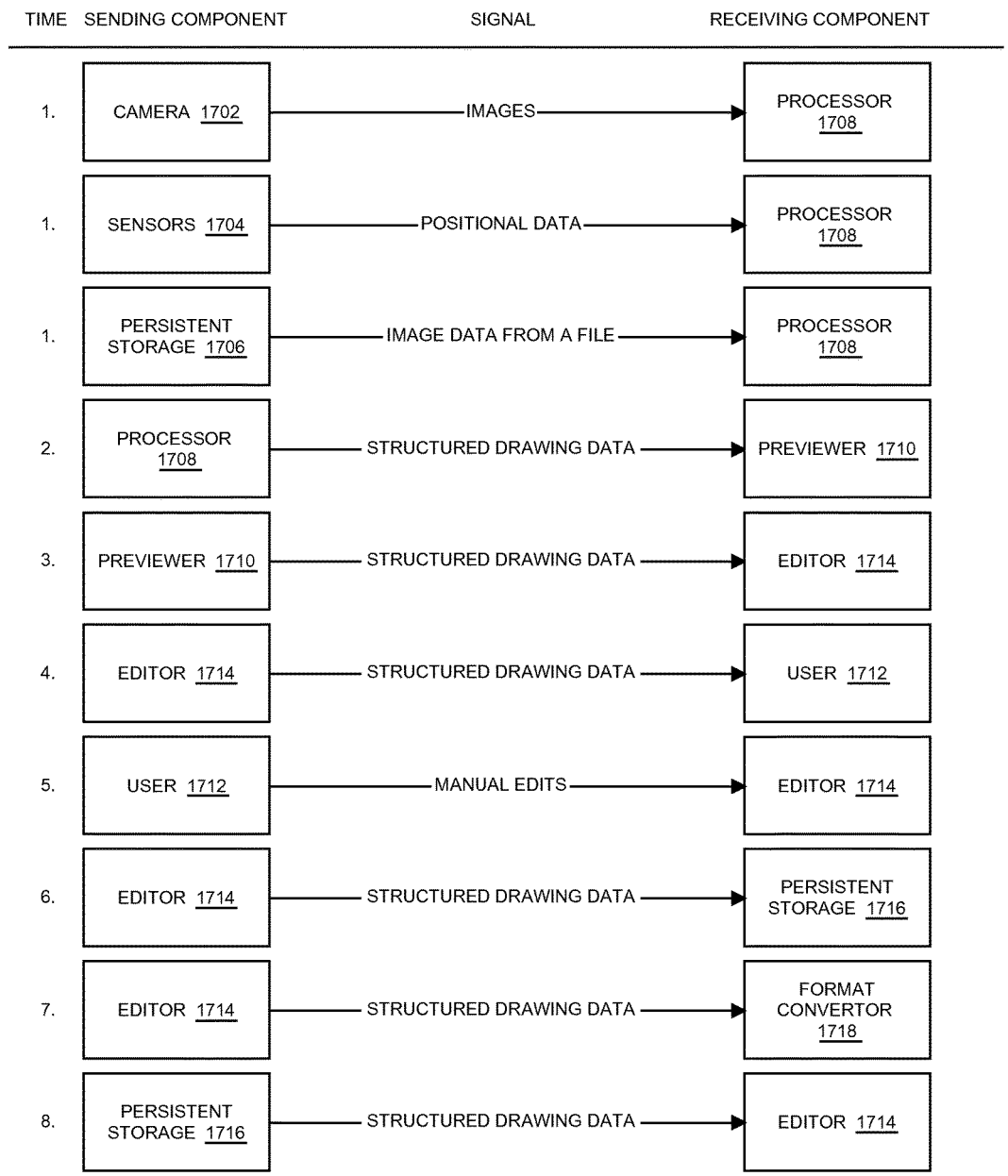
FIG. 18 is an action flow diagram of an embodiment of an image processing system.
Figure 19:
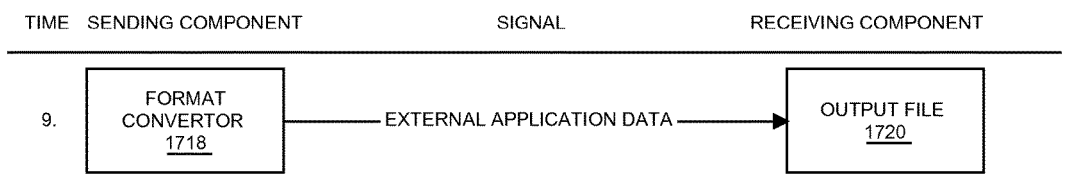
FIG. 19 is an action flow diagram of an embodiment of an image processing system.
Figure 20:
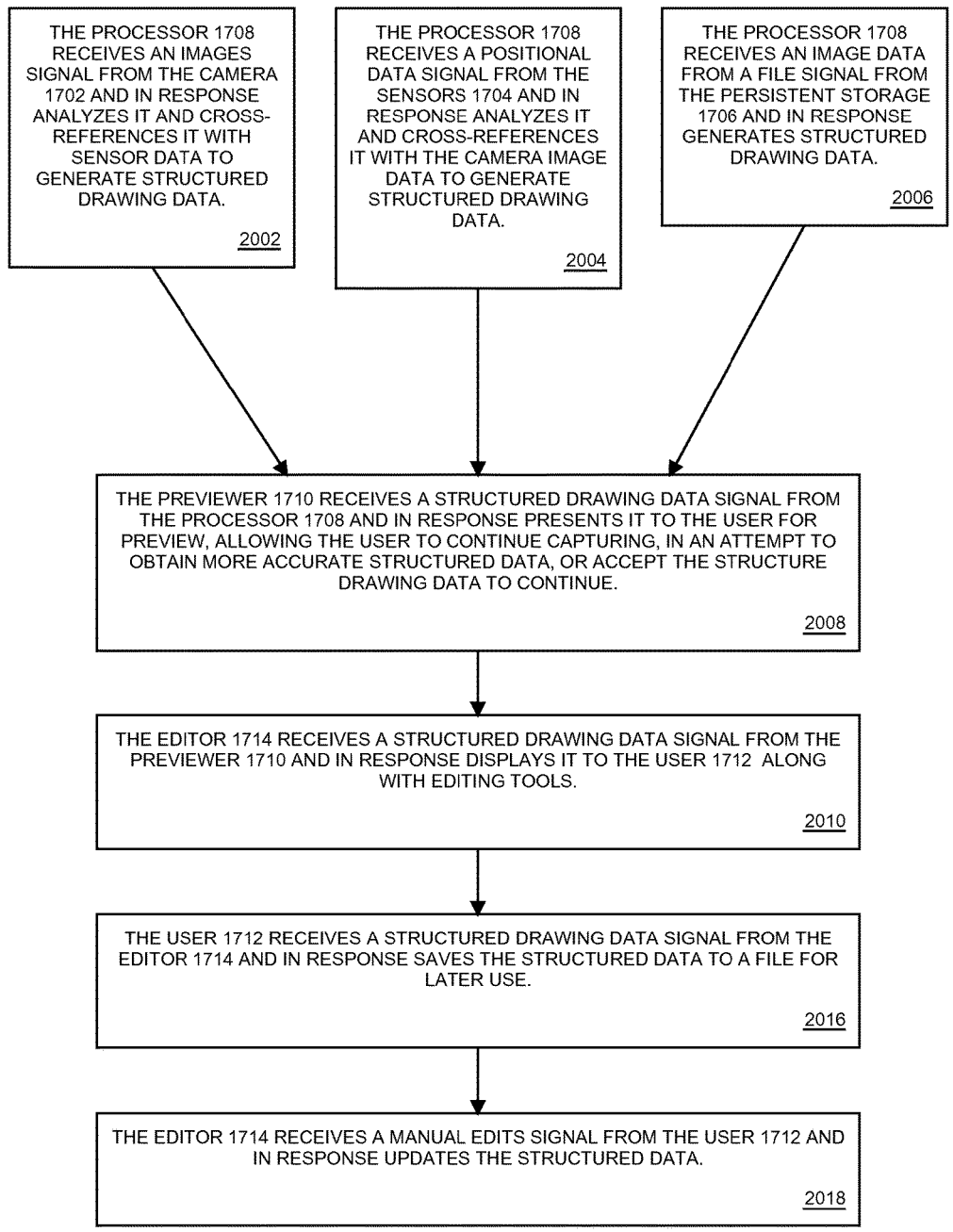
FIG. 20 is a flow chart of an embodiment of an image processing system.
Figure 21:
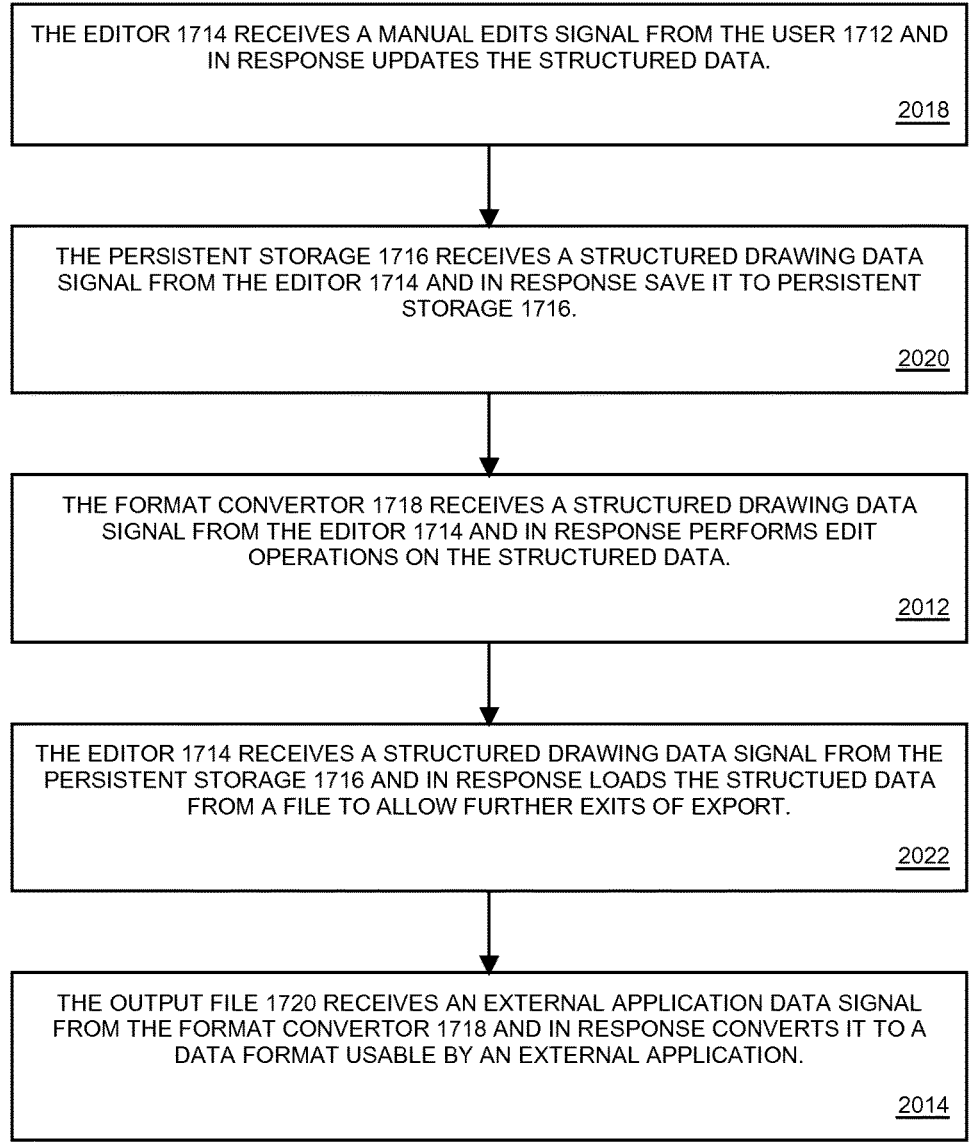
FIG. 21 is the second page of the flow chart of an embodiment of an image processing system.

FIG. 17 is a system diagram of an embodiment of a raw image processing system. FIG. 18 is an action flow diagram of an embodiment of a raw image processing system process. FIG. 19 is an action flow diagram of an embodiment of a raw image processing system process. FIG. 20-21 is a flow chart of an embodiment of a raw image processing system process. Collectively, these drawings illustrate details of raw image processing to convert a digital raw image including geometric objects into a format in which the geometric objects are parameterized (converted to structured metadata defining the geometry of the objects). The system comprises Camera 1702, Sensors 1704, Persistent Storage 1706, Processor 1708, Previewer 1710, user 1712, Editor 1714, persistent Storage 1716, Format Convertor 1718, and Output file 1720. Processor 1708 receives an Images signal from Camera 1702 and in response analyzes it and cross-references it with sensor data to generate structured drawing data (2002). Processor 1708 receives a Positional Data signal from Sensors 1704 and in response analyzes it and cross-references it with the camera raw image data to generate structured drawing data (2004). Processor 1708 receives a raw image Data From A File signal from Persistent Storage 1706 and in response generates structured drawing data (2006). Previewer 1710 receives a Structured Drawing Data signal from Processor 1708 and in response presents it to the user for preview, allowing the user to continue capturing in an attempt to obtain more accurate structured data, or accept and continue (2008). Editor 1714 receives a Structured Drawing Data signal from Previewer 1710 and in response displays it to the user along with editing tools (2010). Format Convertor 1718 receives a Structured Drawing Data signal from Editor 1714 and in response performs edit operations on the structured data (2012). Editor 1714 receives a Manual Edits signal from user 1712 and in response updates the structured data (2018). user 1712 receives a Structured Drawing Data signal from Editor 1714 and in response saves the structured data to a file for later use (2016). Editor 1714 receives a Structured Drawing Data signal from persistent Storage 1716 and in response loads the structured data from a file to allow further exits of export (2022). persistent Storage 1716 receives a Structured Drawing Data signal from Editor 1714 and in response save it to persistent storage (2020). Output file 1720 receives an External Application Data signal from Format Convertor 1718 and in response converts it to a data format usable by an external application (2014).

Figure 22:
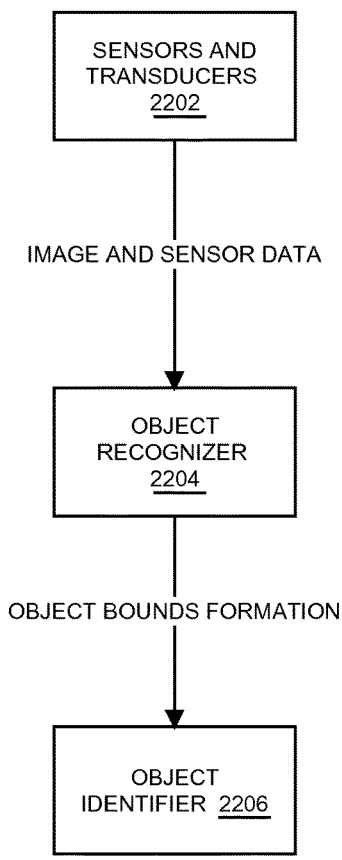
FIG. 22 is a system diagram of an embodiment of an image processing system.
Figure 23:
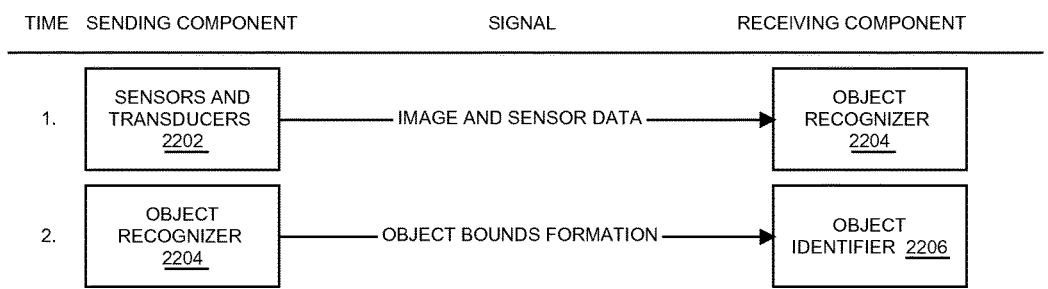
FIG. 23 is an action flow diagram of an embodiment of an image processing system.
Figure 24:
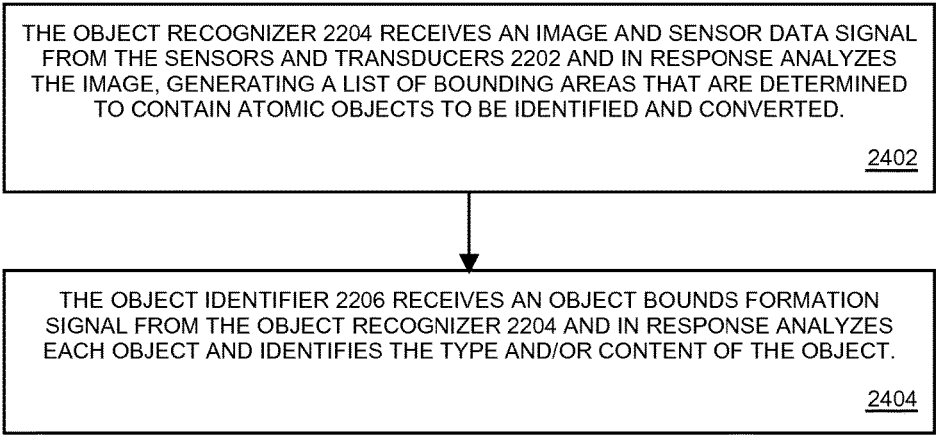
FIG. 24 is a flow chart of an embodiment of an image processing system.

FIG. 22 is a system diagram of an embodiment of a raw image processing system. FIG. 23 is an action flow diagram of an embodiment of a raw image processing system process. FIG. 24 is a flow chart of an embodiment of a raw image processing system process. Collectively these drawings illustrate a system to perform object recognition in a digital raw image (or images). The system comprises sensors and transducers 2202, Object recognizer 2204, and Object Identifier 2206. Object recognizer 2204 receives a raw image and Sensor data signal from sensors and transducers 2202 and in response analyzes the raw image, generating a list of bounding areas that are determined to contain atomic objects to be identified and converted (2402). Object Identifier 2206 receives an Object bounds formation signal from Object recognizer 2204 and in response analyzes each object and identifies the type and/or content of the object (2404).

Figure 25:
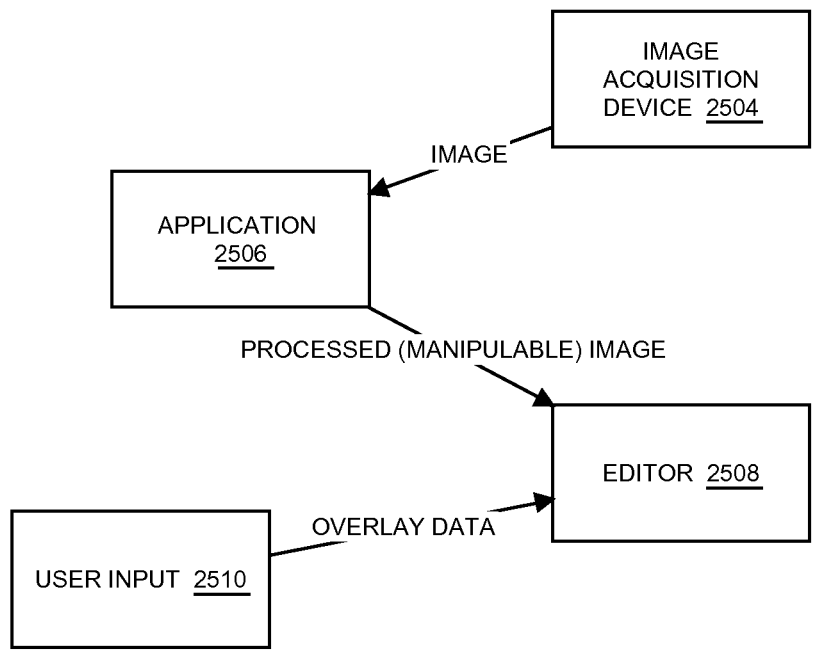
FIG. 25 is a system diagram of an embodiment of a system for creating a hybrid image.
Figure 26:
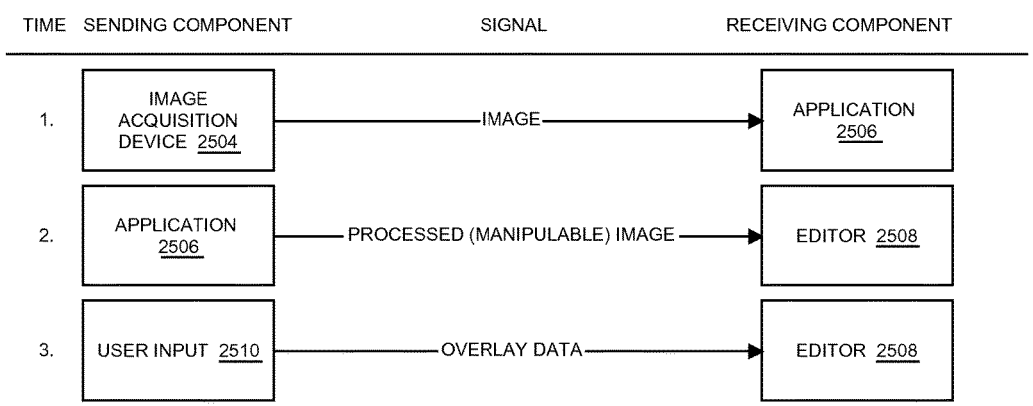
FIG. 26 is an action flow diagram of an embodiment of a system for creating a hybrid image process.
Figure 27:
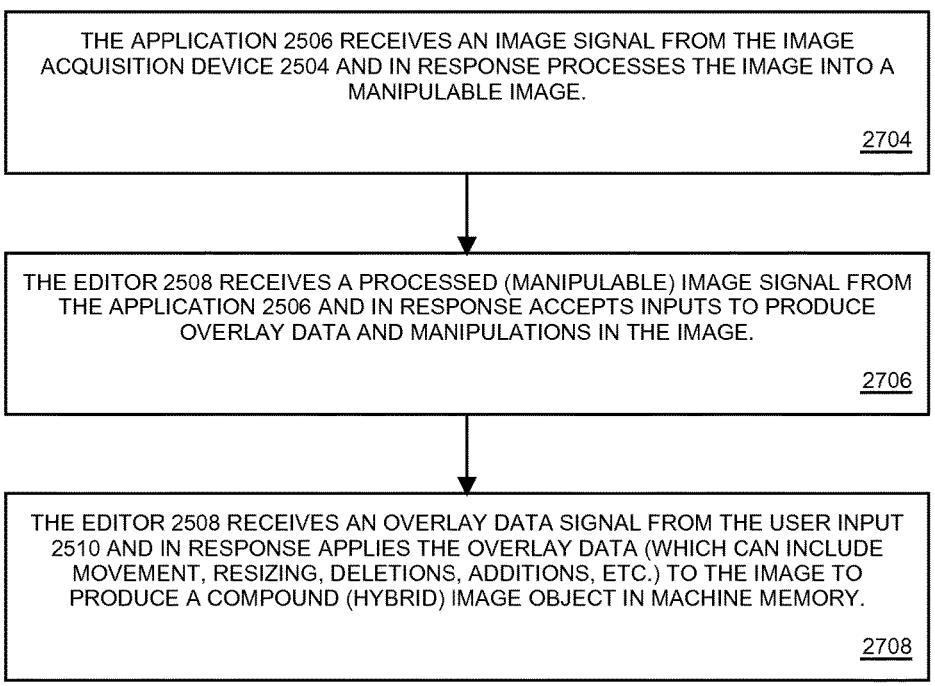
FIG. 27 is a flow chart of an embodiment of a system for creating a hybrid process.

FIG. 25 is a system diagram of an embodiment of a system for creating a hybrid raw image. FIG. 26 is an action flow diagram of an embodiment of a system for creating a hybrid raw image process. FIG. 27 is a flow chart of an embodiment of a system for creating a hybrid process. Collectively these drawings illustrate a system that utilizes user input to identify and define geometric objects in a raw image. The system comprises Image Acquisition Device 2504, Application 2506, Editor 2508, and User Input 2510. Application 2506 receives a raw image signal from Image Acquisition Device 2504 and in response processes the raw image into a manipulable raw image (2704). Editor 2508 receives a processed (manipulable) raw image signal from Application 2506 and in response accepts inputs to produce overlay data and manipulations in the raw image (2706). Editor 2508 receives an overlay data signal from User Input 2510 and in response applies the overlay data (which can include movement, re-sizing, deletions, additions, etc.) to the raw image to produce a compound (hybrid) raw image object in machine memory (2708).

Figure 28:
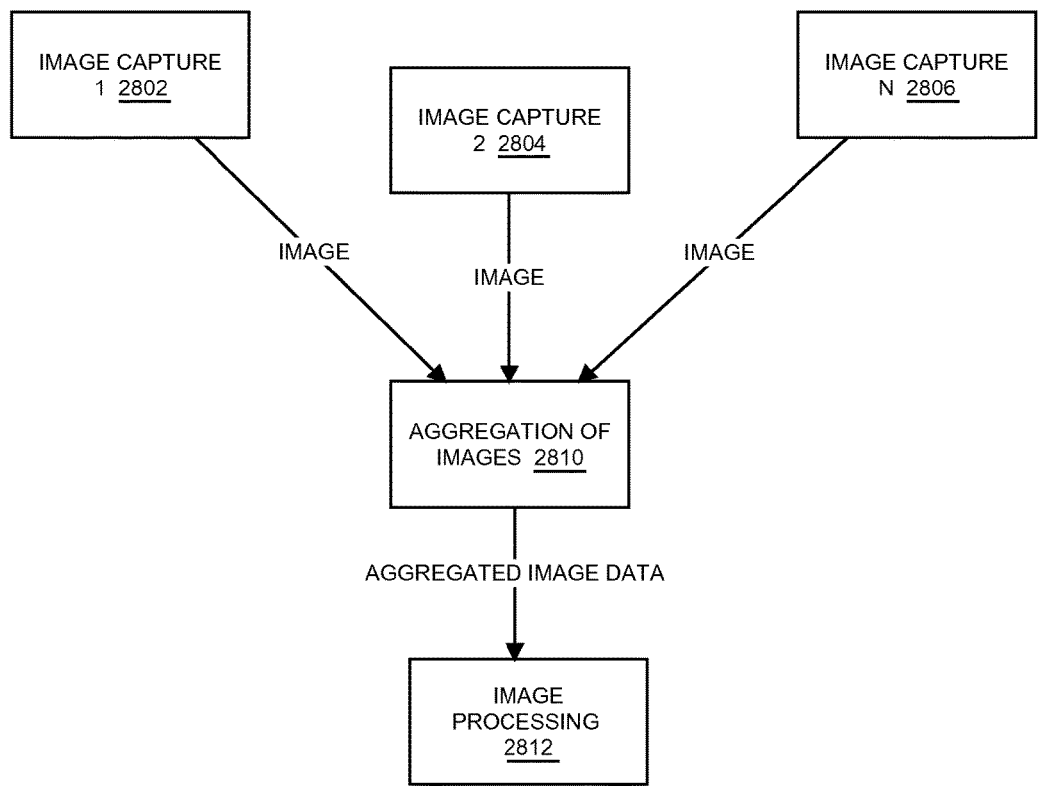
FIG. 28 is a system diagram of an embodiment of an aggregation and processing of multiple image capture.
Figure 29:
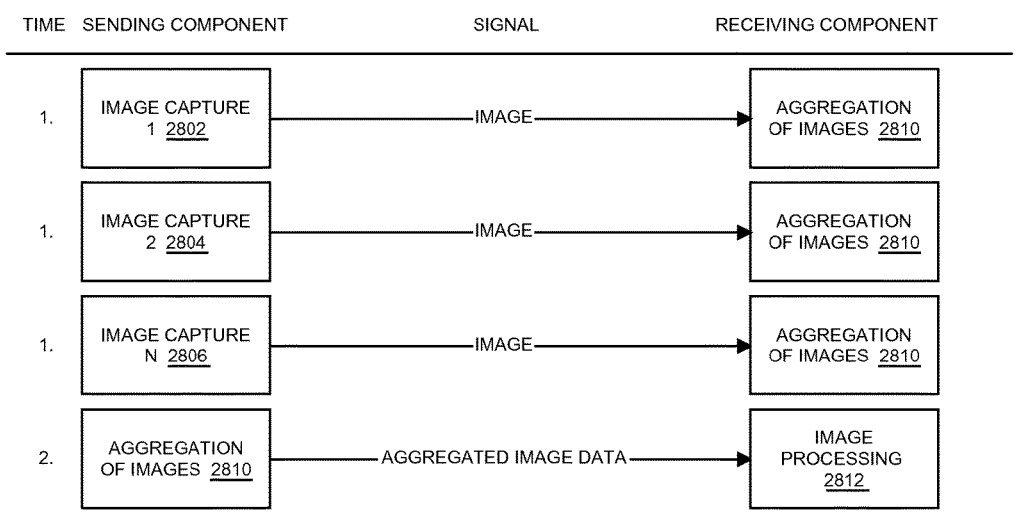
FIG. 29 is an action flow diagram of an aggregation and processing of multiple image capture.
Figure 30:
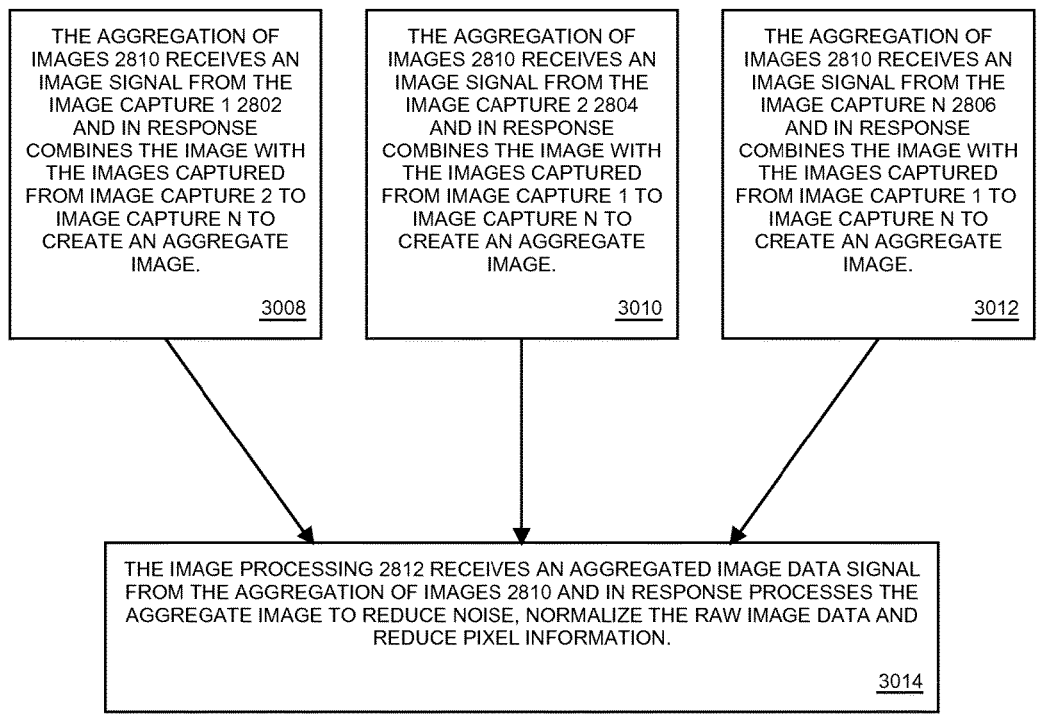
FIG. 30 is a flow chart of an embodiment of an aggregation and processing of multiple image capture.

FIG. 28 is a system diagram of an embodiment of an aggregation and processing of multiple raw image capture. FIG. 29 is an action flow diagram of an embodiment of an aggregation and processing of multiple raw image capture process. FIG. 30 is a flow chart of an embodiment of an aggregation and processing of multiple raw image capture process. Collectively, these drawings illustrate a system that can utilize multiple images, from possibly multiple vantage points/perspectives, to identify objects and interconnections among objects. The system comprises Image Capture 1 2802, Image Capture 2 2804, Image Capture n 2806, Aggregation of images 2810, and Image Processing 2812. Aggregation of images 2810 receives a raw image signal from Image Capture 1 2802 and in response combines the raw image with the images captured from Image Capture 2 2804 to Image Capture n 2806 to create an aggregate raw image (3008). Aggregation of images 2810 receives a raw image signal from Image Capture 2 2804 and in response combines the raw image with the images captured from Image Capture 1 2802 to Image Capture n 2806 to create an aggregate raw image (3010). Aggregation of images 2810 receives a raw image signal from Image Capture n 2806 and in response combines the raw image with the images captured from Image Capture 1 2802 to Image Capture n 2806 to create an aggregate raw image (3012). Image Processing 2812 receives an aggregated raw image data signal from Aggregation of images 2810 and in response Processes the aggregate raw image to reduce noise, normalize the raw image data and reduce pixel information (3014).

Figure 31:
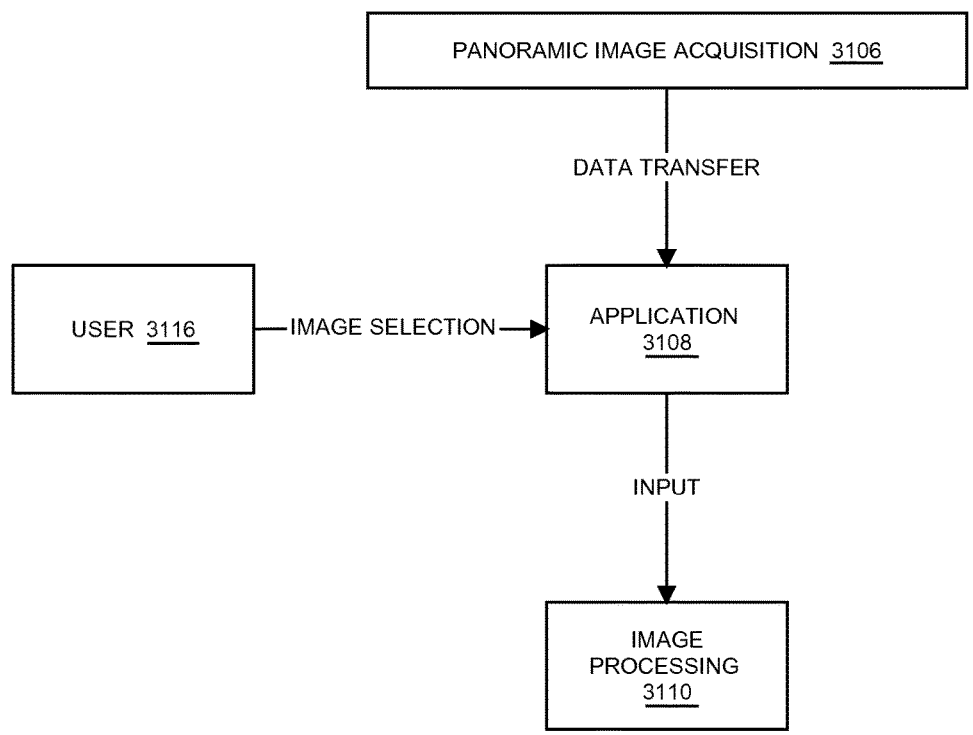
FIG. 31 is a system diagram of an embodiment of a panoramic image acquisition and processing.
Figure 32:
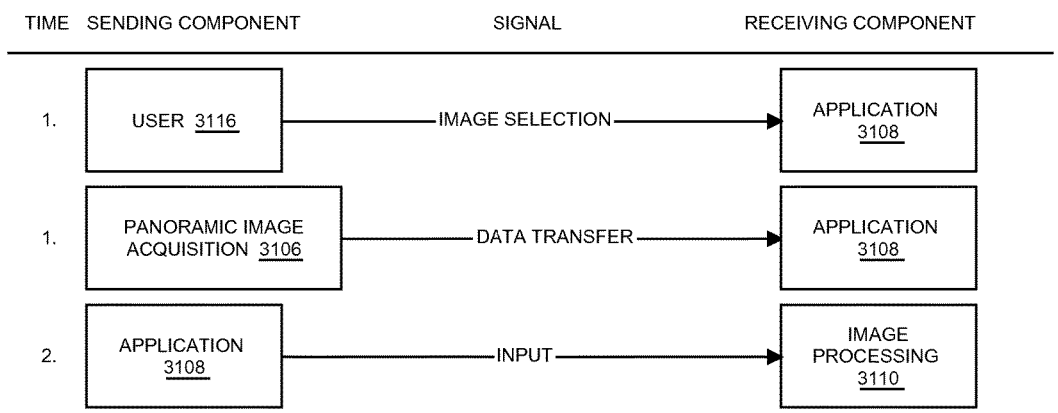
FIG. 32 is an action flow diagram of an embodiment of a panoramic image acquisition and processing.
Figure 33:
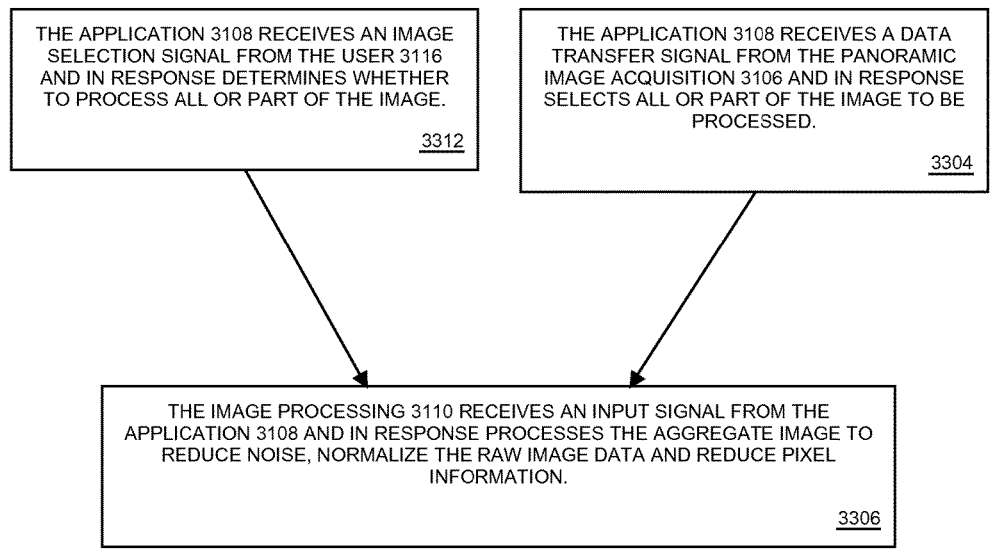
FIG. 33 is a flow chart of an embodiment of a panoramic image acquisition and processing.
Figure 34:
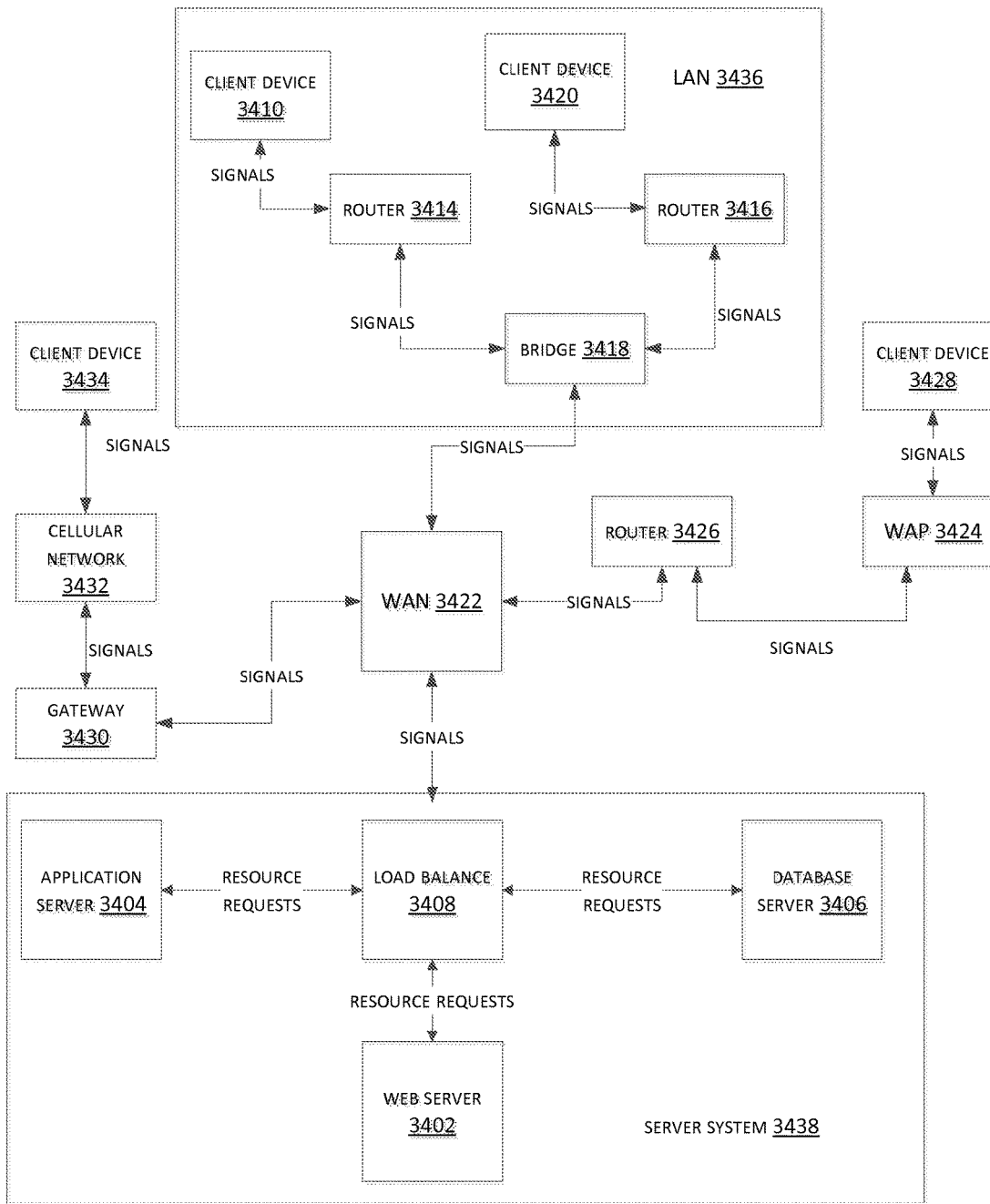
FIG. 34 is a figure describing a machine network to carry out image acquisition and processing as described herein.
Figure 35:
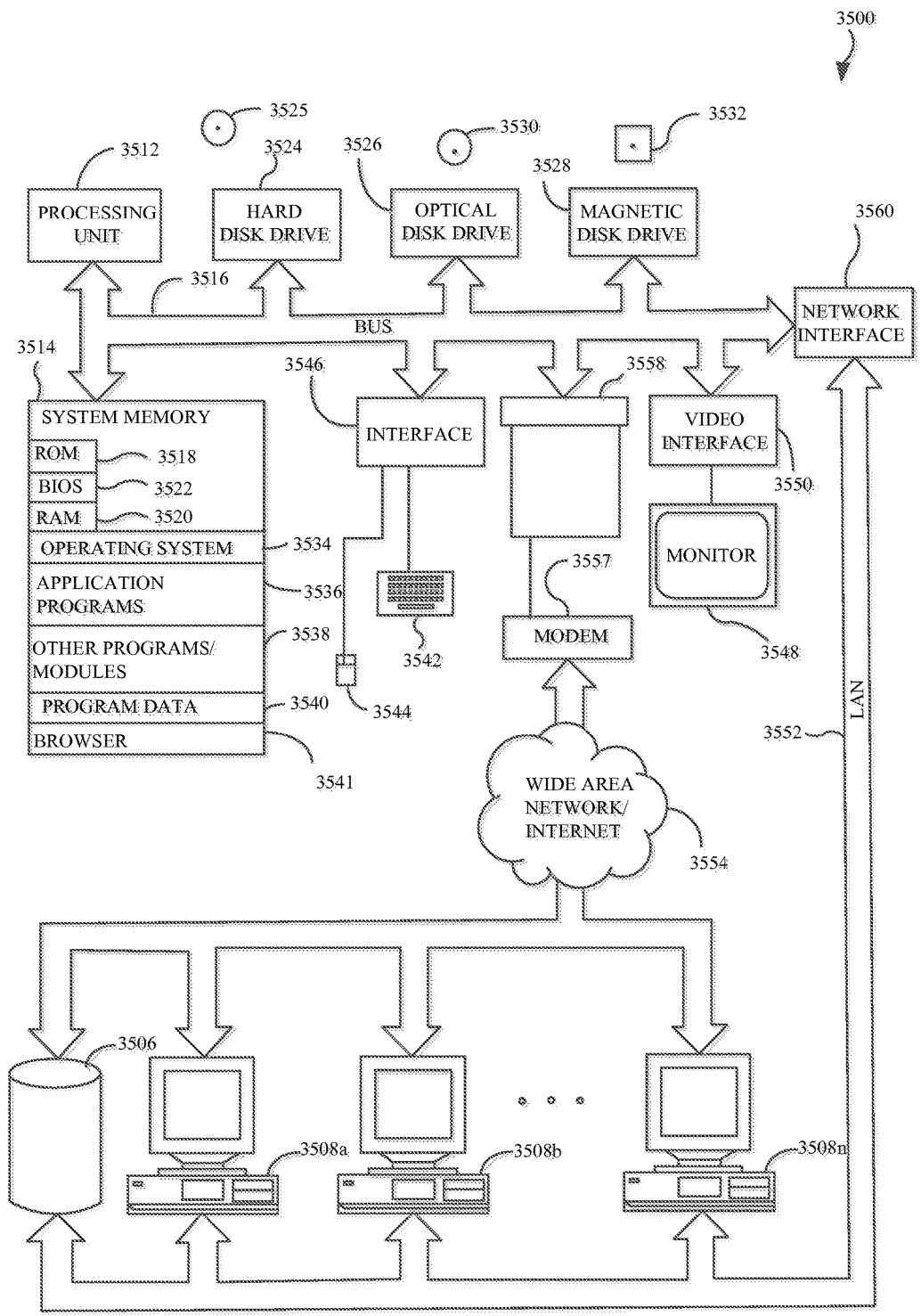
FIG. 35 is a figure describing a computing device and associated machine network to implement an image processing system.

FIG. 31 is a system diagram of an embodiment of a panoramic raw image acquisition and processing. FIG. 32 is an action flow diagram of an embodiment of a panoramic raw image acquisition and processing process. FIG. 33 is a flow chart of an embodiment of a panoramic raw image acquisition and processing process. Collectively, these drawings illustrate a panoramic raw image processing system. The system comprises Panoramic image acquisition 3106, Application 3108, Image Processing 3110, and User 3116. Application 3108 receives a raw image selection signal from User 3116 and in response determines whether to process all or part of the raw image (3312). Application 3108 receives a Data transfer signal from Panoramic image acquisition 3106 and in response selects all or part of the raw image to be processed (3304). Image Processing 3110 receives an Input signal from Application 3108 and in response Processes the aggregate raw image to reduce noise, normalize the raw image data and reduce pixel information (3306).

Several network access technologies between client devices and server resources are illustrated, including cellular network 2132, LAN 2136, and WAP 2124. Signals representing server resource requests are output from client devices 2110, 2120, 2128>, and 2134 to the various access networks, from which they are propagated to a WAN 2122 (e.g., the Internet) and from there to a server system. These signals are typically encoded into standard protocols such as Internet Protocol (IP), TCP/IP, and HTTP. When the clients are part of a LAN 2136, the signals may be propagated via one or more router 2114 2116 and a bridge 2118. A router 2126 may propagate signals from the WAP 2124 to the WAN 2122. A gateway 2130 may propagate signals from the cellular network 2132 to the WAN 2122. The server system 2138 in this example comprises a number of separate server devices, typically each implemented in the separated machine, although this is not necessarily the case. The signals from the client devices are provided via a load balancing server 2108 to one or more application server 2104 and one or more database server 2116. Load balancing server 2108 maintains an even load distribution to the other server, including web server 2102, application server 2104, and database server 2106. Each server in the drawing may represent in effect multiple servers of that type. The load balancing server 2108, application server 2104, and database server 2106 may collectively implement a raw image processing system system as described herein. The signals applied to the database server 2106 may cause the database server 2106 to access and certain memory addresses, which correlates to certain rows and columns in a memory device. These signals from the database server 2106 may also be applied to application server 2104 via the load balancing server 2108. Signals applied by the application server 2104, via the load balancing server 2108, to the web server 2102, may result in web page modifications which are in turn communicated to a client device, as described herein in regards to user interface and interaction signals to and from a client device. The raw image processing system system described herein may thus be implemented as devices coordinated on a LAN, or over a wide geographical area utilizing a WAN or cellular network, or over a limited area (room or house or store/bar) utilizing a WAP. Features of client logic to capture a raw image and communicate it to a raw image processing system may thus be implemented, for example, as an application (app) on a mobile phone interfacing to a network in one of the manners illustrated in this figure. The raw image processing system described herein may be implemented as a pure or hybrid peer to peer system in a local or widely distributed area.

The computer system 2200 may implement an embodiment of a raw image processing system as described herein. A particular computer system 2200 of the machine network may include one or more processing units 2212, a system memory 2214 and a system bus 2216 that couples various system components including the system memory 2214 to the processing units 2212. The processing units 2212 may be any logic processing unit, such as one or more central processing units (CPUs), digital signal processors (DSPs), application-specific integrated circuits (ASICs), field programmable gate arrays (FPGAs), etc. The system bus 2216 can employ any known bus structures or architectures, including a memory bus with memory controller, a peripheral bus, and a local bus. The system memory 2214 includes read-only memory (ROM) 2218 and random access memory (RAM) 2220. A basic input/output system (BIOS) 2222, which can form part of the ROM 2218, contains basic routines that help transfer information between elements within the computer system 2200, such as during start-up.

The computer system 2200 may also include a plurality of interfaces such as network interface 2260, interface 2258 supporting modem 2257 or any other wireless/wired interfaces.

The computer system 2200 may include a hard disk drive 2224 for reading from and writing to a hard disk 2225, an optical disk drive 2226 for reading from and writing to removable optical disks 2230, and/or a magnetic disk drive 2228 for reading from and writing to magnetic disks 2232. The optical disk 2230 can be a CD-ROM, while the magnetic disk 2232 can be a magnetic floppy disk or diskette.

The hard disk drive 2224, optical disk drive 2226 and magnetic disk drive 2228 may communicate with the processing unit 2212 via the system bus 2216. The hard disk drive 2224, optical disk drive 2226 and magnetic disk drive 2228 may include interfaces or controllers (not shown) coupled between such drives and the system bus 2216, as is known by those skilled in the relevant art. The drives 2224, 2226 and 2228, and their associated computer-readable storage media 2225, 2230, 2232, may provide non-volatile and non-transitory storage of computer readable instructions, data structures, program modules and other data for the computer system 2200. Although the depicted computer system 2200 is illustrated employing a hard disk 2224, optical disk 2226 and magnetic disk 2228, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 2212.

Program modules can be stored in the system memory 2214, such as an operating system 2234, one or more application programs 2236, other programs or modules 2238 and program data 2240. Application programs 2236 may include instructions that cause the processor(s) 2212 to automatically provide dynamic selection of data and telecommunication service providers before or during communications between various devices such as, for example, a mobile device and a landline telephone. Other program modules 2238 may include instructions for handling security such as password or other access protection and communications encryption. The system memory 2214 may also include communications programs, for example, a Web client or browser 2241 for permitting the computer system 2200 to access and exchange data with sources such as Web sites of the Internet, corporate intranets, extranets, or other networks and devices as described herein, as well as other server applications on server computing systems. The browser 2241 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 2214, the operating system 2234, application programs 2236, other programs/modules 2238, program data 2240 and browser 2241 can be stored on the hard disk 2225 of the hard disk drive 2224, the optical disk 2230 of the optical disk drive 2226 and/or the magnetic disk 2232 of the magnetic disk drive 2228.

An operator can enter commands and information into the computer system 2200 through input devices such as a touch screen or keyboard 2242 and/or a pointing device such as a mouse 2244, and/or via a graphical user interface. Other input devices can include a microphone, joystick, game pad, tablet, scanner, etc. These and other input devices are connected to one or more of the processing units 2212 through an interface 2246 such as a serial port interface that couples to the system bus 2216, although other interfaces such as a parallel port, a game port or a wireless interface or a universal serial bus (USB) can be used. A monitor 2248 or other display device is coupled to the system bus 2216 via a video interface 2250, such as a video adapter. The computer system 2200 can include other output devices, such as speakers, printers, etc.

The computer system 2200 can operate in a networked environment using logical connections to one or more remote computers and/or devices. For example, the computer system 2200 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks. Communication may take place between the computer system 2200 and external devices via a WAN 2254 or LAN 2252. External devices may include other computer system 2208a-n (collectively, 2208) and external storage devices 2206.

What is claimed is:

1. A non-transitory computer-readable storage medium, the computer-readable storage medium including instructions that when executed by a computer, cause the computer to:
   receive an image from an image acquisition device;
   recognize lines in the image as follows:
      search for white pixels in the image;
      when a white pixel is found:
         (a) search surrounding pixels of the white pixel to create a longest straight line passing through only white pixels and mark pixels close to the longest straight line as found;
         (b) from the start of the longest straight line:
            (i) search the surrounding pixels to find the longest connected straight line passing through only white pixels and marking the pixels close to the longest connected straight line as found;
            (ii) continue (i) until there are no more white pixels or found pixels;
            (iii) if an intersection is found for forming two connected lines, save the intersection and continue with step (i) in each available direction from the intersection;
         (c) from the end of the longest straight line, perform steps (i), (ii), and (iii);
      connect the lines from the line recognizer to form connected lines by adding to the image a connector that joins proximally positioned terminal ends of the lines;
      recognize bounded objects in the image using a bounded object recognizer as follows:
         identify lines that end close to another line and when found connect them by adding a connector to the image; and
         (e) identify sets of connected lines that form closed shapes and extract the shapes in order of shortest to largest path; and
      on a machine display, overlay the shapes on the image as independently manipulable objects.

2. The computer-readable storage medium of claim 1, further including instructions that when executed by the computer, cause the computer to:
   reduce pixels in the image to a single channel;
   apply a smoothing filter to image to generate a filtered image; and
   subtract the filtered image from the image.

3. The computer-readable storage medium of claim 1, further including instructions that when executed by the computer, cause the computer to:
   determine a starting threshold based on an intensity gradient of the image;
   adjust the starting threshold to minimize a number of isolated pixels in the image;
   perform a threshold operation to further reduce the pixels; and
   perform dilation/erosion operations to adjust a thickness of linear segments formed by the pixels.

4. The computer-readable storage medium of claim 1, further including instructions that when executed by the computer, cause the computer to:
   scan through strings in the image;
   for each string, identify two vertexes that are farthest apart;
   calculate a shortest route between the vertexes;
   generate a set of points representing a line along the shortest route;
   fit a line to the set of points;
   if a length of the line is greater than the minimum line length parameter;
      calculate an average fit error of the points to the line;
      if the fit error is less than the minimum line length parameter;
         (i) remove line segments making up the line from the string;
         (ii) move all remaining disconnected segments to new strings;
         (iii) define a new line from best-fit parameters for the points; and
   add the new line to the lines from the line recognizer.

5. The computer-readable storage medium of claim 1, further including instructions that when executed by the computer, cause the computer to adjust the length of the lines by:
   scanning each bounded object and calculating a distance between the two farthest vertices;
   calculating an average of the distances; and
   adjusting a minimum line length parameter based on the average.

6. The computer-readable storage medium of claim 1, further comprising instructions that when executed by the computer, cause the computer to identify strings that are below a threshold length and that overlay other strings and move such strings to a chaff category, as follows:
   scan through the strings;
   calculate a length of each string;
   if the string is shorter than a first parameter, move it to chaff; and
   if the string is shorter than a second parameter and overlays another string, move it to chaff.

7. The computer-readable storage medium of claim 6, further comprising instructions that when executed by the computer, cause the computer to identify strings that qualify as chaff, as follows:
   check each string against other strings to see if it is (a) isolated from the other strings, and (b) below a threshold length.

* * * * *